United States Patent [19]
Nakagawa et al.

[11] Patent Number: 5,774,561
[45] Date of Patent: Jun. 30, 1998

[54] SUBBAND ACOUSTIC ECHO CANCELLER

[75] Inventors: Akira Nakagawa, Kokubunji; Yoichi Haneda, Tokyo; Shoji Makino, Machida; Suehiro Shimauchi; Junji Kojima, both of Tokyo, all of Japan

[73] Assignee: Nippon Telegraph and Telephone Corp., Tokyo, Japan

[21] Appl. No.: 695,446

[22] Filed: Aug. 12, 1996

[30]     Foreign Application Priority Data

Aug. 14, 1995  [JP]  Japan .................................. 7-206929

[51] Int. Cl.$^6$ .................................................. H04B 3/20
[52] U.S. Cl. .......................... 381/66; 381/94.1; 379/406; 379/410
[58] Field of Search ........................... 381/66, 94.1, 71.1, 381/71.11; 379/406, 408, 410, 407, 411

[56]            References Cited

U.S. PATENT DOCUMENTS

| | | | |
|---|---|---|---|
| 5,272,695 | 12/1993 | Makino et al. | 379/410 |
| 5,566,167 | 10/1996 | Dottweiler | 379/410 |
| 5,721,772 | 2/1998 | Haneda | 379/410 |

FOREIGN PATENT DOCUMENTS

| | | |
|---|---|---|
| 443547A2 | 8/1991 | European Pat. Off. . |
| 91/11060 | 7/1991 | WIPO . |

*Primary Examiner*—Minsun Oh Harvey
*Attorney, Agent, or Firm*—Pollock, Vande Sande & Priddy

[57]             ABSTRACT

In a subband acoustic echo canceller which generates an echo replica from a subband received signal $x_k(m)$ by an estimated echo path in each subband, subtracts the echo replica from a subband echo signal $y_k(m)$ by a subtractor to generate a subband error signal $e_k(m)$ and uses an adaptive algorithm in an echo path estimation part to estimate the transfer function of the estimated echo path from the subband error signal $e_k(m)$ and the subband received signal $x_k(m)$ so that the subband error signal $e_k(m)$ approaches zero, the stop-band attenuation of each band-pass filter of a received signal subband analysis part for generating the subband received signal $x_k(m)$ is set to be smaller than the stop-band attenuation of each band-pass filter of an echo subband analysis part for generating the subband echo signal $Y_k(m)$ to thereby flatten the frequency characteristics of the subband received signals relative to the subband echo signals.

16 Claims, 21 Drawing Sheets

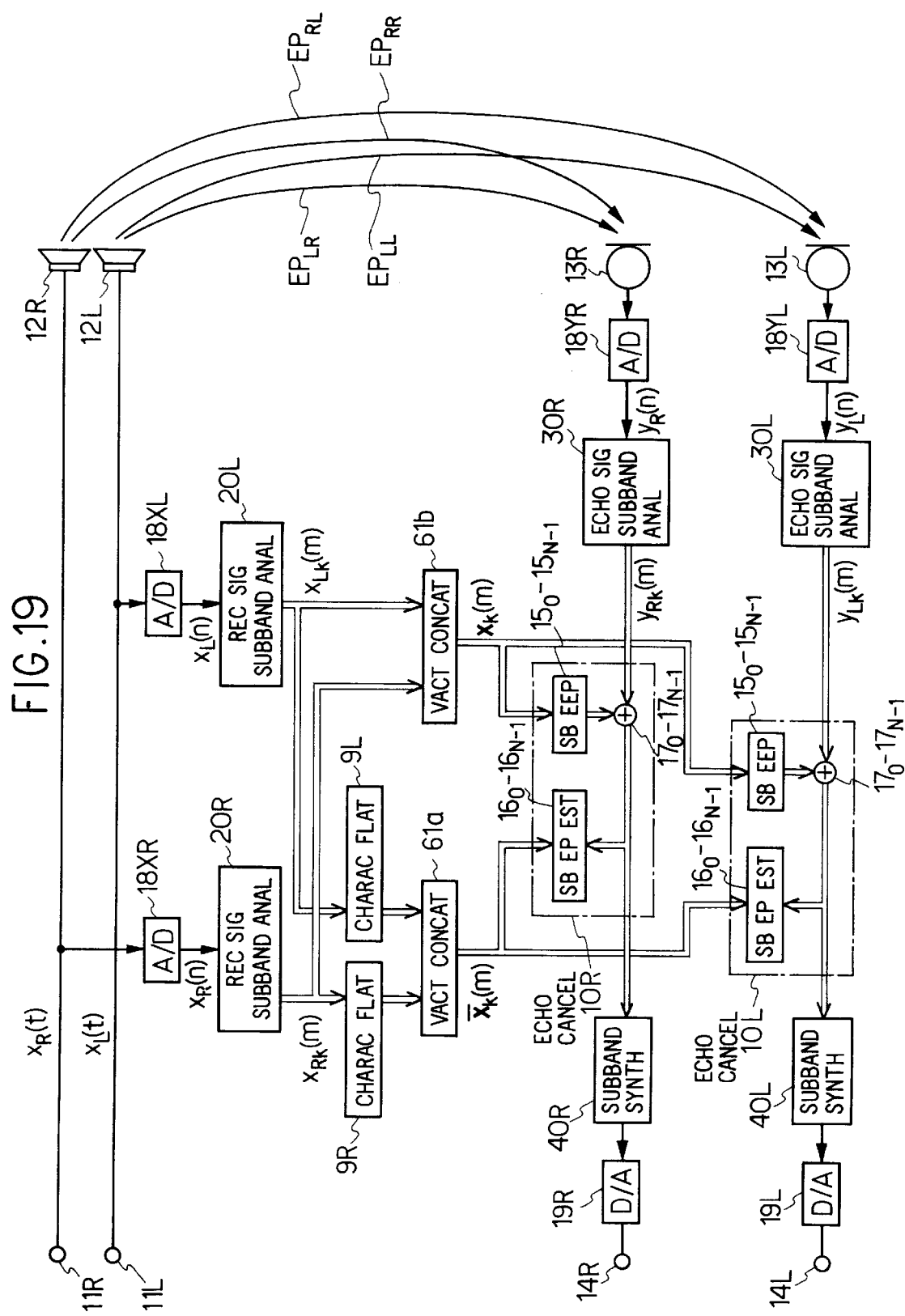

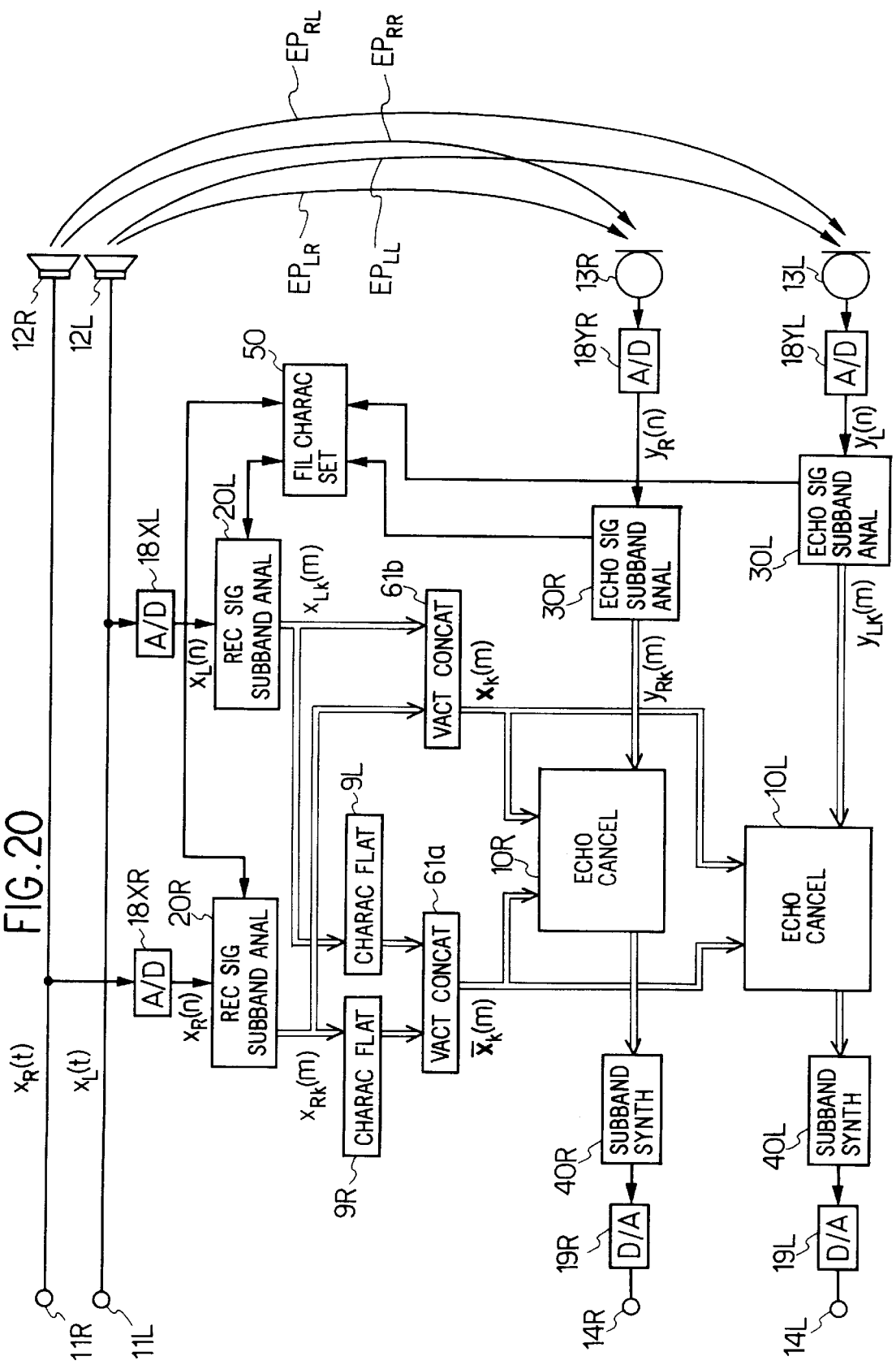

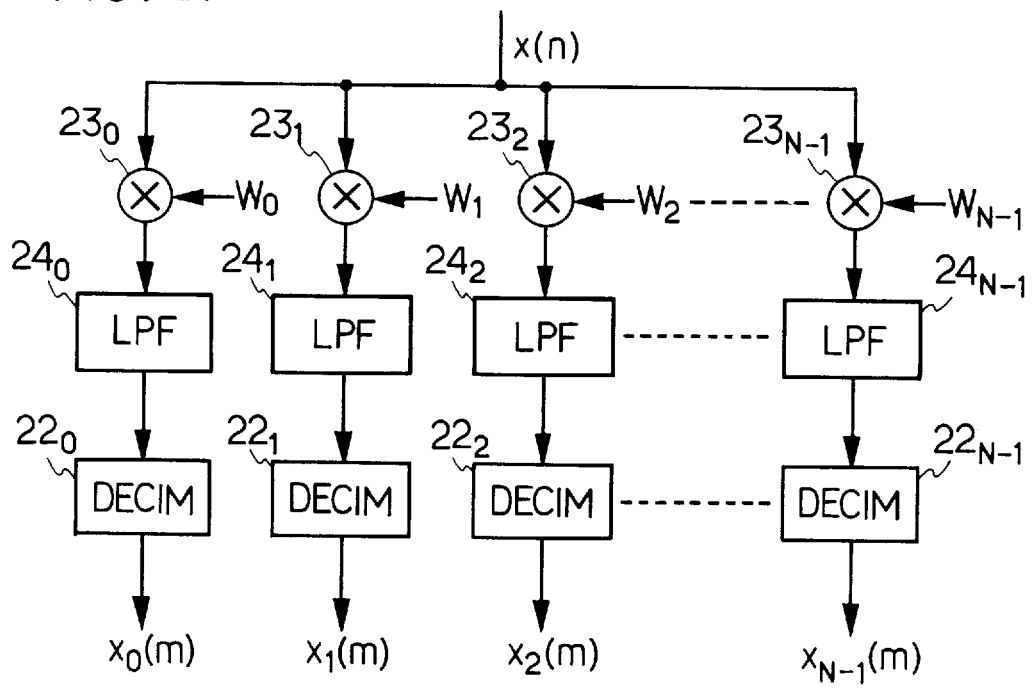
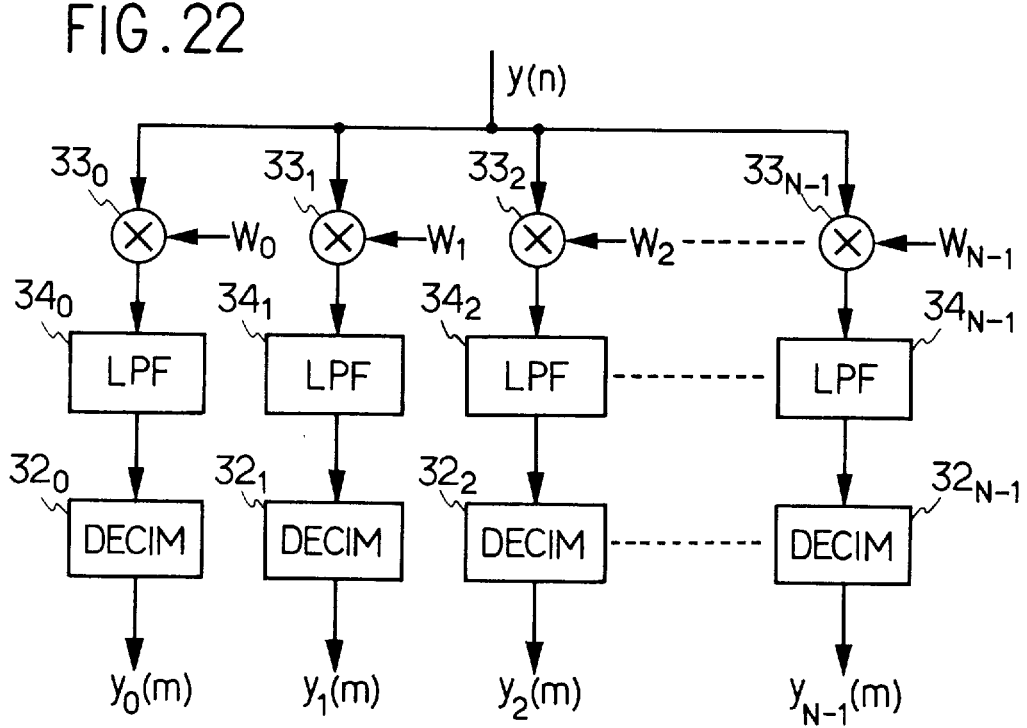

SUBBAND ACOUSTIC ECHO CANCELLER

BACKGROUND OF THE INVENTION

The present invention relates to a subband acoustic echo canceller and, more particularly, to a subband acoustic echo canceller for cancelling echoes which would otherwise cause howling and present psycho-acoustic problems in a hands-free telecommunication system and other two-way communication systems.

With the recent spread of hands-free communication systems such as an audio teleconference system, there is a growing demand for the development of a two-way communication system which is excellent in communication performance and in echo cancellation. To meet this demand, research and development are now being carried out on echo cancellers.

To facilitate a better understanding of the present invention, a description will be given first, with reference to FIG. 1, of a conventional echo canceller applied to a hands-free communication system as disclosed in U.S. Pat. No. 5,272,695 or British Patent Application Laid-Open GB2240452. Reference numeral 11 denotes a received signal input terminal, 12 a loudspeaker, 13 a microphone, 14 a transmission signal output terminal, 15 an estimated echo path, 16 an echo path estimation part, 17 a subtractor, 18X and 18Y A/D converters, and 19 a D/A converter. In the hands-free communication system that is composed of a received signal path from the received signal input terminal 11 for a received signal x(t) to the loudspeaker 12 and a transmission signal path from the microphone 13 to the transmission signal output terminal 14, the received signal x(t) is sampled by the A/D converter 18X at a sampling frequency fs and converted into a digital received signal x(n). Supposing that the received signal x(t) has a bandwidth 0 to $f_w$ Hz, the sampling frequency fs is usually set to $2f_w$. On the other hand, an echo y(t) picked up by the microphone 13 is sampled by the A/D converter 18Y at the sampling frequency fs and converted into a digital echo y(n). These digital signals x(n) and y(n) will hereinafter be referred to as a received signal and an echo, respectively.

The received signal x(n) is supplied to the estimated echo path 15. An echo replica ŷ(n) that is provided from the estimated echo path 15 is subtracted by the subtractor 17 from the echo y(n) to obtain an estimation error (a residue) e(n). Then the transfer function h(i) of an echo path EP is estimated by the echo path estimation part 16 from the estimation error e(n) and the received signal x(n), and the thus obtained estimated transfer function ĥ(i) is set in the estimated echo path 15. The echo y(n) can be reduced by updating, upon each application of the received signal x(n), the estimated transfer function ĥ(i) so that the estimation error e(n) approaches zero. The estimation error e(n) is converted by the D/A converter 19 into an analog signal e(t), which is output from the terminal 14.

The estimated echo path 15 needs to follow temporal variations of the echo path EP. The estimated echo path 15 is formed by a digital FIR filter, for instance, and the filter coefficient that is provided to the estimated echo path 15 is iteratively updated by the echo path estimation part 16 so that the residue e(n)=y(n)−ŷ(n) approaches zero. The echo path estimation part 16 uses an LMS (Least Mean Squares) algorithm, normalized LMS (NLMS) algorithm or similar algorithm. By such updating of the estimated echo path 15, the echo canceller is always held in the optimum condition.

On the other hand, since the above-described echo canceller involves much computational complexity for the adjustment of the filter coefficient, such a subband acoustic echo canceller as described below is now being put to practical use.

FIG. 2 illustrates a conventional subband acoustic echo canceller disclosed in the aforementioned U.S. Pat., which divides the frequency band of the received signal x(n) into N subbands and cancels an echo in each subband. The parts corresponding to those in FIG. 1 are identified by the same reference numerals. In FIG. 2, reference numerals 18X and 18Y denote A/D converters, 19 a D/A converter, 20 and 30 echo signal subband analysis parts, 40 a subband synthesis part, $15_k$ each subband estimated echo path, $16_k$ each subband echo path estimation part and $17_k$ each subband subtractor. In this instance, k=0,1, . . . ,N−1. Assume that the full bandwidth of the received signal x(n) is rated with a width $2\pi$ from $-\pi$ to $+\pi$, for instance, and the division of the entire frequency band into M (an even number equal to or greater than 2) is to obtain N subband signals $x_k(n)$ from the received signal x(n) by N=(M/2+1) band-pass filters. The generation of such N subband signals will hereinafter be referred to as the division of the received signal x(n) into N subband signals.

The received signal x(n) from the A/D converter 18X is applied to the received signal subband analysis part 20, wherein it is divided into N subband signals $x_k(m)$ (where k=0, . . . ,N−1). Similarly, the echo y(n) is divided by the echo subband analysis part 30 into N subband signals $y_k(m)$. The received signal subband analysis part 20 and the echo subband analysis part 30 are exactly identical in construction.

The subband estimated echo paths $15_k$ (where k=0, . . . ,N−1) are provided which have a one-to-one correspondence with the divided subbands. The echo $Y_k(m)$ can be reduced by subtracting therefrom an echo replica $\hat{Y}_k(m)$ from each subband estimated echo path $15_k$ by the subband subtractor $17_k$. The resulting subband residues $e_k(m)=y_k(m)-\hat{y}_k(m)$ are synthesized into the full-band residue e(n) in the subband synthesis part 40.

FIG. 3 schematically illustrates the internal configuration of the received signal subband analysis part 20. Reference numeral $21_k$ denotes band-pass filters and $22_k$ decimation parts. In this case, k=0,1, . . . ,N−1. The received signal x(n) is band limited by the band-pass filter $21_k$. The band-limited signal $x_k(n)$ is decimated into $x_k(m)$ by the decimation part $22_k$ at a decimation ratio R. The echo y(n) is also decimated into $y_k(m)$ by the decimation part $22_k$ at the decimation ratio R. The echo subband analysis part 30 also has the same configuration as depicted in FIG. 3.

FIG. 4 schematically illustrates the configuration of the subband synthesis part 40. Reference numeral $41_k$ denotes interpolation parts, $42_k$ interpolating filters and 43 an adder. In this case, k=0,1, . . . ,N1. Each subband residue $e_k(m)$ is interpolated by the interpolation part $41_k$ and the interpolating filter $42_k$ at an interpolation ratio R. The respective subband signals thus interpolated are added by the adder to obtain the full-band residue signal e(n).

By dividing the received signal x(n) into a plurality of subbands as mentioned above, each subband signal is approximately flattened (or whitened)—this brings an advantage that the convergence speed of the estimated transfer function ĥ(i) of the estimated echo path in the respective subband is higher than in the case of the full-band echo cancellation. Besides, it is well-known in the art that since the bandwidth of each subband becomes 1/M of the entire bandwidth of the received signal x(n) by dividing it into N subbands, the realization of an ideal band-pass filter for each subband could permit effective reduction of the computational complexity in each subband by decimating samples of the subband signal $x_k(n)$ at the decimation ratio R=M.

On the other hand, sampling of the input signal at the frequency $f_s$ gives rise to a problem commonly called aliasing that frequency components higher than the sampling frequency $f_s$ are folded back toward the lower frequency side. The aliasing is also caused by decimation (i.e. downsampling). Where the sampling frequency $f_s$ of the A/D converter is set to twice the entire bandwidth of the input signal x(t) and the input signal is divided by N ideal band-pass filters into N subbands, no aliasing will occur if the sampling frequency $f_s'=f_s/R$ after decimation at the decimation ratio R is chosen to be twice or more the subband width $F_B$. When $f_s'=2F_B$, M=R holds.

To approximate the band-pass filter characteristic to an ideal one (i.e. to approximate the transition region from the cutoff frequency fc to a stop-band cutoff frequency fraction $f_{sc}$ to zero) and to approximate the stop-band attenuation to infinity, it is necessary to increase the number of filter taps, but this increases the amount of processing required of the filter and lengthens the transfer delay time, resulting in the processing time also becoming longer. Thus, there is a limit to increasing the number of filter taps and the attenuation in the stop band of the band-pass filter cannot sufficiently be increased. On this account, if the decimation ratio R is chosen to be close to the number M of partitions, the aliasing of the subband signal enters into the pass band. To avoid this, the prior art chooses the decimation ratio R to be appreciably smaller than the dividing number M. As the result of this, the characteristic of the output signal from each band-pass filter 23k remains affected by its characteristic as indicated by the broken line in FIG. 5A, for instance.

On the other hand, the frequency characteristic of the transfer function h(i) of the echo path EP to be estimated is flat over the entire band of the frequency region as shown in FIG. 5B. In the conventional subband acoustic echo canceller, since the band-pass filters for the received signal and the band-pass filters for the echo are identical in configuration with each other, the band-limited signal $x_k(m)$ indicated by the broken line in FIG. 5A is used to estimate the echo in the form of ŷ=xĥ from the non-band-limited echo path transfer function h(i) shown in FIG. 5B, thereby obtaining such a band-limited echo replica ŷ as depicted in FIG. 5C. This means that it is necessary to estimate a high level portion B1 of the transfer function in FIG. 5B from a high level portion of the broken-lined signal in the pass band (0 to $\pi/2$) in FIG. 5A and estimate a high level portion B2 of the transfer function in FIG. 5B, equal to the above-mentioned portion B1, from a low level portion A2 of the broken-lined signal in the stop band ($\pi/2$ to $\pi$) in FIG. 5A. Since the low level portion A2 of the broken-lined signal in the stop band shown in FIG. 5A is used to estimate the transfer function in the high level portion B2 in FIG. 5B in the form of ĥ=xh/x, the transfer function becomes closer to the form of 0/0 with a decrease in the value x. Consequently, the operation becomes unstable; moreover much time is required for estimating these portions with required accuracy and the convergence speed decreases. Additionally, the application of the band-pass signal, which contains a signal component having an attenuation characteristic above the cutoff frequency $f_c$ as indicated by the broken line in FIG. 5A, to the subband echo path estimation part $16_k$ and the subband estimated echo path $15_k$ indicates that the whitening of the signal in each subband is insufficient and that the maximum convergence speed is not attained.

Thus, as compared with the full-band echo canceller, the conventional subband acoustic echo canceller involves problems of the degradation of convergence performance, such as the reduction of the steady-state ERLE (Echo Return Loss Enhancement) and the convergence speed.

SUMMARY OF THE INVENTION

It is therefore an object of the present invention to provides a subband acoustic echo canceller which is free from the above-mentioned shortcomings of the prior art and hence is high in convergence speed.

A subband acoustic echo canceller according to a first aspect of the present invention comprises:

a received signal subband analysis part for dividing a received signal into a plurality of subband signals;

an echo signal subband analysis part for dividing an echo signal into a plurality of subband echo signals;

a plurality of subband estimated echo paths, each formed by a digital filter which is provided in each subband supplied with the corresponding subband received signal and generates a subband echo replica;

a plurality of subband subtraction parts for subtracting the subband echo replicas from the plurality of subband received signals to generate subband error signals, respectively;

a plurality of subband echo path estimation parts for estimating the transfer functions of the subband estimated echo paths from the subband error signals and the subband received signals by an adaptive algorithm so that the subband error signals are reduced to zero; and a subband synthesis part for synthesizing the subband error signals;

wherein the received signal subband analysis part and the echo signal subband analysis part include: a plurality of received signal band-pass filters and a plurality of echo signal band-pass filters for dividing the received signal and the echo signal into pluralities of subbands to generate subband received signals and subband echo signals, respectively; and decimation parts for decimating the subband received signals and the subband echo signals at predetermined decimation ratios to generate the plurality of subband received signals and the plurality of subband echo signals, respectively; and wherein the stop-band attenuation of each of the received signal band-pass filters of the received signal analysis part is set at a value smaller than the stop-band attenuation of each of the echo signal band-pass filters of the echo signal analysis part.

A subband acoustic echo canceller according to a second aspect of the present invention comprises:

a received signal subband analysis part for dividing a received signal into a plurality of subband signals;

an echo signal subband analysis part for dividing an echo signal into a plurality of subband echo signals;

a plurality of subband estimated echo paths, each formed by a digital filter which is provided in each subband supplied with the corresponding subband received signal and generates a subband echo replica;

a plurality of subband subtraction parts for subtracting the subband echo replicas from the plurality of subband received signals to generate subband echo signals, respectively;

a plurality of subband echo path estimation parts for estimating the transfer functions of the subband estimated echo paths from the subband error signals and the subband received signals by an adaptive algorithm so that the subband error signals are reduced to zero; and a subband synthesis part for synthesizing the subband error signals;

wherein the received signal subband analysis part and the echo signal subband analysis part include: a plurality of received signal band-pass filters and a plurality of echo signal band-pass filters for dividing the received signal and the echo signal into pluralities of subbands to generate subband received signals and subband echo signals, respectively; and decimation parts for decimating the subband received signals and the subband echo signals at predetermined decimation ratios to generate the plurality of subband received signals and the plurality of subband echo signals, respectively; and wherein a plurality of frequency characteristic flattening parts are provided for flattening the frequency characteristics of the subband received signals that are applied to the subband echo path estimation parts of the respective subbands.

In the subband acoustic echo cancellers according to the first and second aspects of the invention, the band-pass filters of the received signal subband analysis part and the band-pass filters of the echo signal analysis part may be replaced by pluralities of multipliers for frequency-shifting the received signal and the echo signal toward the lower frequency side by frequency widths that sequentially increment by fixed widths, respectively, and received signal low-pass filters and echo signal low-pass filters for band-limiting the outputs from the multipliers to generate subband received signals and subband echo signals.

BRIEF DESCRIPTION OF THE DRAWINGS

FIG. 19 is a block diagram illustrating a third embodiment of the invention that applies-the FIG. 16 embodiment to a multichannel subband acoustic echo canceller;

FIG. 20 is a block diagram illustrating another embodiment of the invention which combing the first embodiment with the FIG. 19 embodiment;

FIG. 21 is a block diagram illustrating the configuration of a received signal subband analysis part 20 which uses a common base band as subbands;

FIG. 22 is a block diagram illustrating the configuration of an echo signal analysis part 30 which uses a common base band as subbands.

DESCRIPTION OF THE PREFERRED EMBODIMENTS

FIRST EMBODIMENT

Figure 1:
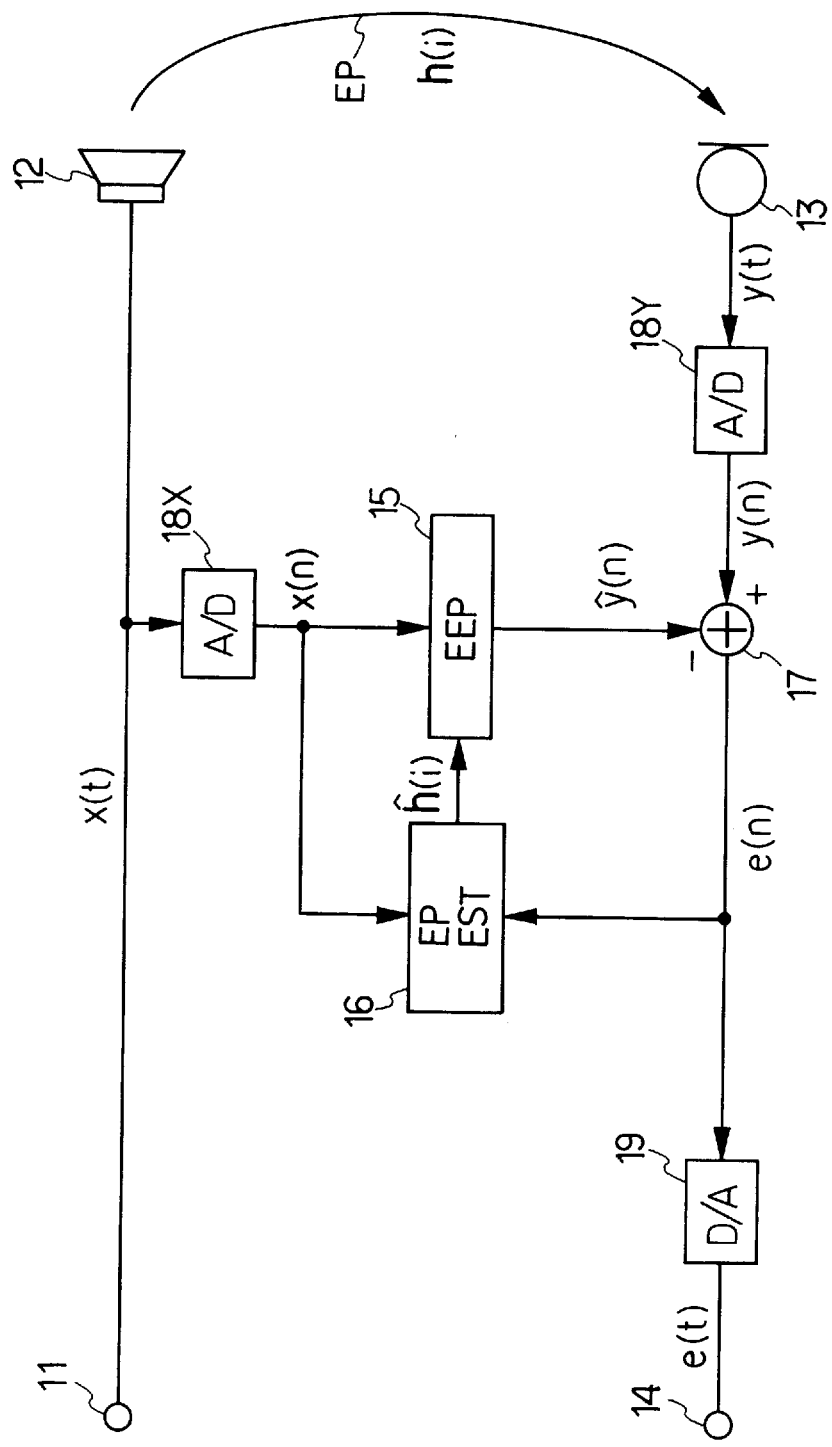
FIG. 1 is a block diagram showing a prior art example of an ordinary echo canceller.

The subband analysis in the subband acoustic echo canceller divides the received signal x(n) into subbands through the use of a band-pass filter bank. The subband acoustic echo canceller reduces the eigenvalue spread by dividing the received signal x(n) into narrow subbands. This whitens the input signal x(n) and increases the convergence speed. Furthermore, downsampling by the decimation lengthens the sampling interval, making it possible to reduce the number of taps necessary for the adaptive digital filter that forms each subband estimated echo path $15_k$.

As described previously, in the conventional subband acoustic echo canceller, when samples of the subband signals are decimated down to a critical sampling frequency, a desired level of steady-state echo return loss enhancement (ERLE) cannot be achieved due to an aliasing distortion caused by a non-ideal band-pass filter (BPF). To provide the non-ideal band-pass filter with a high attenuation outside the subband with a view to approximating it to an ideal band-pass filter, a large BPF tap length is needed. This inevitably increases the required amount of computation and increases the transfer delay; therefore, it is necessary to use a non-ideal band-pass filter with a low attenuation outside the subband. To avoid the aliasing distortion due to the non-ideal band-pass filter, the decimation ratio is chosen to be smaller than the number of subbands. However, since the BPF frequency characteristics remain in the frequency characteristics of each subband signal as indicated by the broken lines in the region from $\pi/2$ to $\pi$ in FIG. 5A, a decrease in the decimation ratio causes the eigenvalue spread. This retards the convergence of the conventional subband acoustic echo canceller (SBEC).

The convergence speed of the subband acoustic echo canceller could be further increased by whitening each subband input signal. To perform this, the first embodiment of the present invention uses two analysis filter banks of different lengths.

For practical use, the BPF length is reduced to decrease the computational complexity and shorten the transfer delay. In determining an optimum decimation ratio, there are the following problems: When the decimation ratio is lowered to lessen the aliasing effect due to the non-ideal band-pass filter, the echo return loss enhancement (ERLE) increases but the convergence speed decreases due to the eigenvalue spread caused by a non-maximum decimation. When the decimation ratio is increased to reduce the eigenvalue spread, the convergence speed increases but the ERLE decreases due to aliasing.

These results indicate two aspects. First, the subband acoustic echo canceller needs to keep the aliasing of the echo signal at a low level in order to achieve higher ERLE. Second, the subband acoustic echo canceller does not need to keep the aliasing of the input signal at a low level to increase the convergence speed. To satisfy these conditions, the first embodiment uses a different band-pass filter for each of the received and echo signals.

Figure 5A:
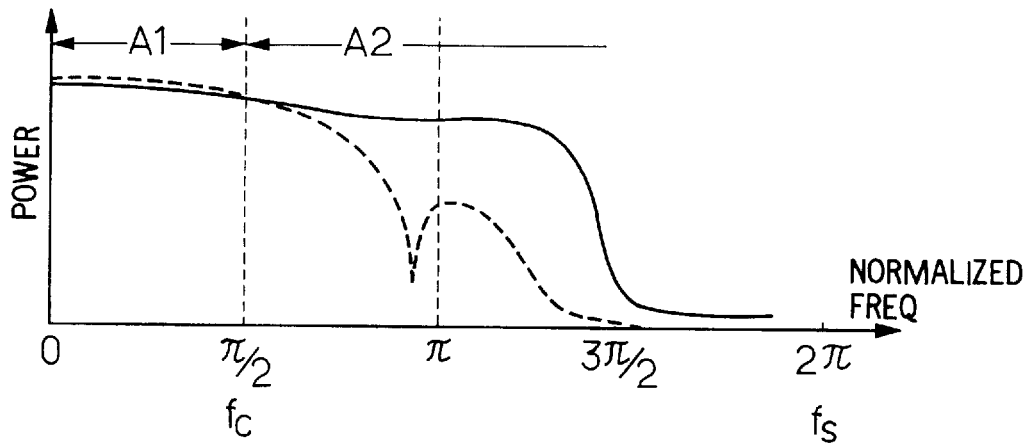
FIG. 5A is a graph showing the frequency characteristic of a band-pass filter.
Figure 5B:
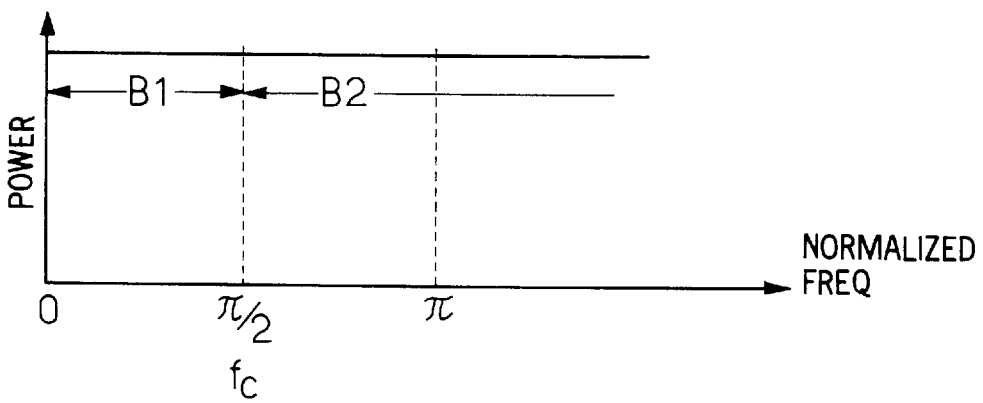
FIG. 5B is a graph showing the frequency characteristic of the transfer function of an echo path.

The use of a low pass filter for the received signal reduces the eigenvalue spread, that is, the stop-band cutoff frequency fsc is chosen to be about three quarters of the subband sampling frequency fs'. On the other hand, the low-pass filter for the echo signal is designed to reduce the aliasing due to decimation; that is, the stop-band cutoff frequency fsc is chosen to be relatively close to the pass band cutoff frequency fpc. These frequency characteristics can easily be obtained by changing the filter lengths for the received signal and the echo signal, i.e. short for the former and long for the latter. In the case where the BPF characteristic for the echo signal y(n) is the same as that of the prior art example indicated by the broken line in FIG. 5A and the BPF length for the received signal x(n) is reduced as mentioned above, the subband received signal $x_k(m)$ has such a frequency characteristic as shown in FIG. 5A, in which the subband received signal level is flattened over the frequency range from the pass band (0 to $\pi/2$) below the cutoff frequency fc to the stop band ($\pi/2$ to n) above the frequency fc as indicated by the solid line; that is, the subband received signal is whitened.

In this filter-bank system, the adaptive digital filter length (the number of taps) which forms the estimated echo path 15k in each subband is expressed by the following equation, taking into account the difference between the two BPF lengths:

$$L_k = L/R + (L_y - L_x)/R$$

where $L_k$: ADF length,
L: impulse response length,
R: decimation ratio,
$L_x$: BPF length for the received signal,
$L_y$: BPF length for the echo signal.

Figure 2:
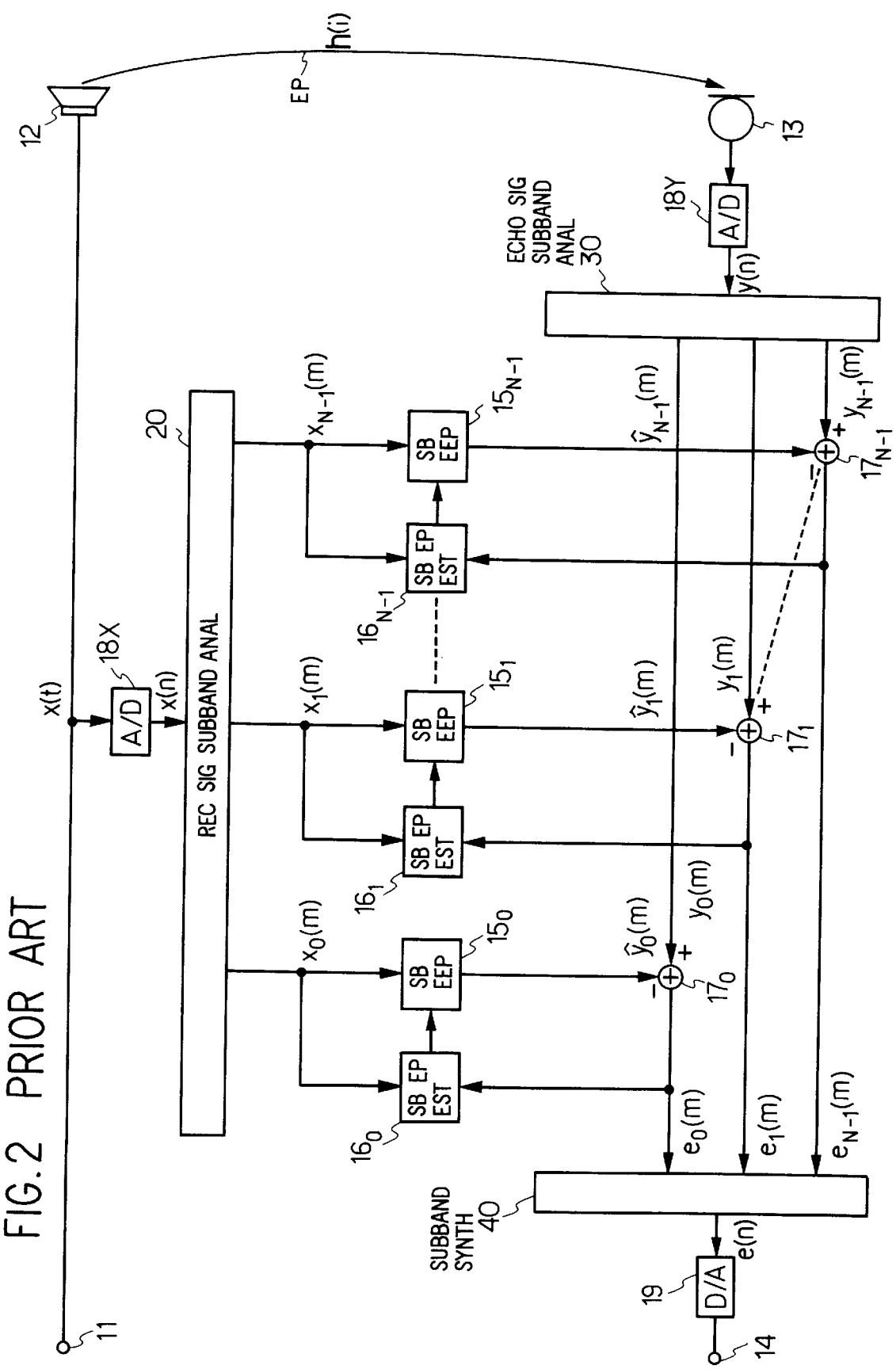
FIG. 2 is a block diagram showing a prior art example of an ordinary subband acoustic echo canceller.
Figure 3:
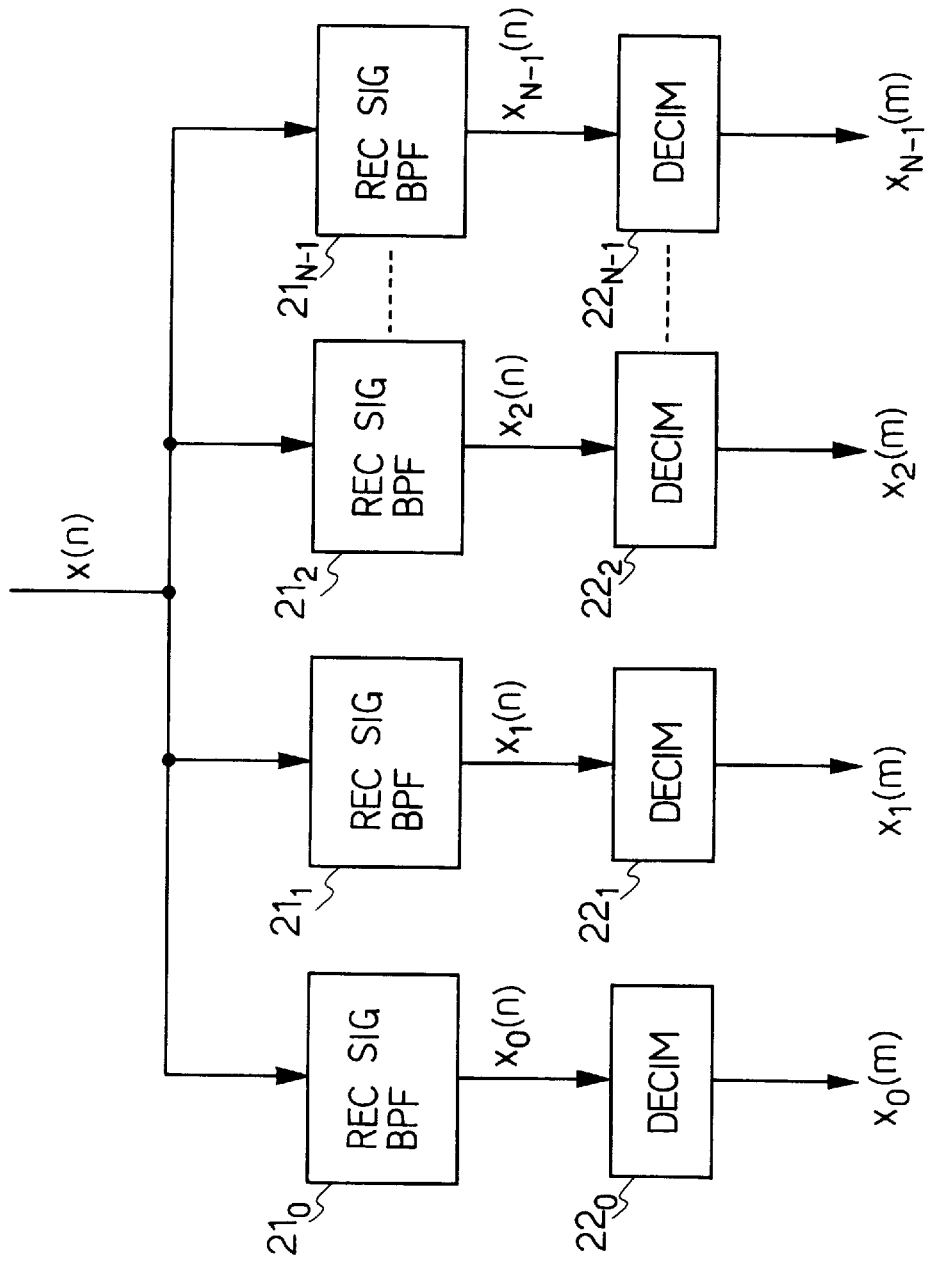
FIG. 3 is a block diagram showing the internal configuration of a subband analysis part in FIG. 2.
Figure 6:
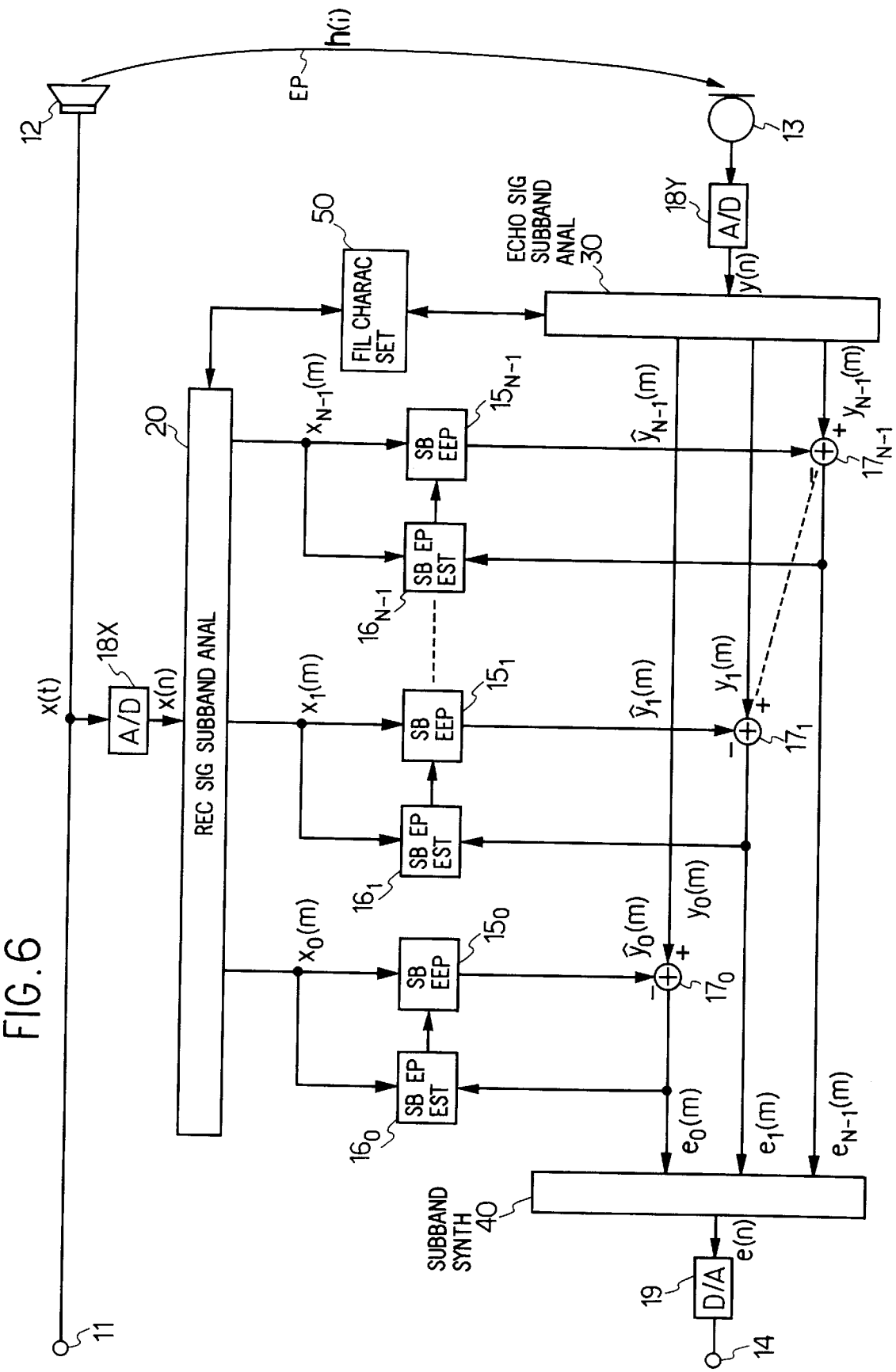
FIG. 6 is a block diagram illustrating a subband acoustic echo canceller according to a first embodiment of the present invention.

Referring now to FIG. 6, the first embodiment of the present invention will be described. The parts corresponding to those in FIG. 2 are identified by the same reference numerals. Reference numeral 20 denotes a received signal subband analysis part, 30 an echo signal subband analysis part, and 50 a filter characteristic setting part. The filter setting part 50 is one that sets the characteristics of each band-pass filter $21_k$ for the received signal and each band-pass filter $31_k$ for the echo signal so that the stop-band attenuation of the latter is larger than that of the former. This can be implemented by setting the filter length of the band-pass filter $31_k$ of the echo signal subband analysis part 30 to be larger than the filter length of the band-pass filter $21_k$ of the received signal subband analysis part 20 as described later in detail.

Figure 4:
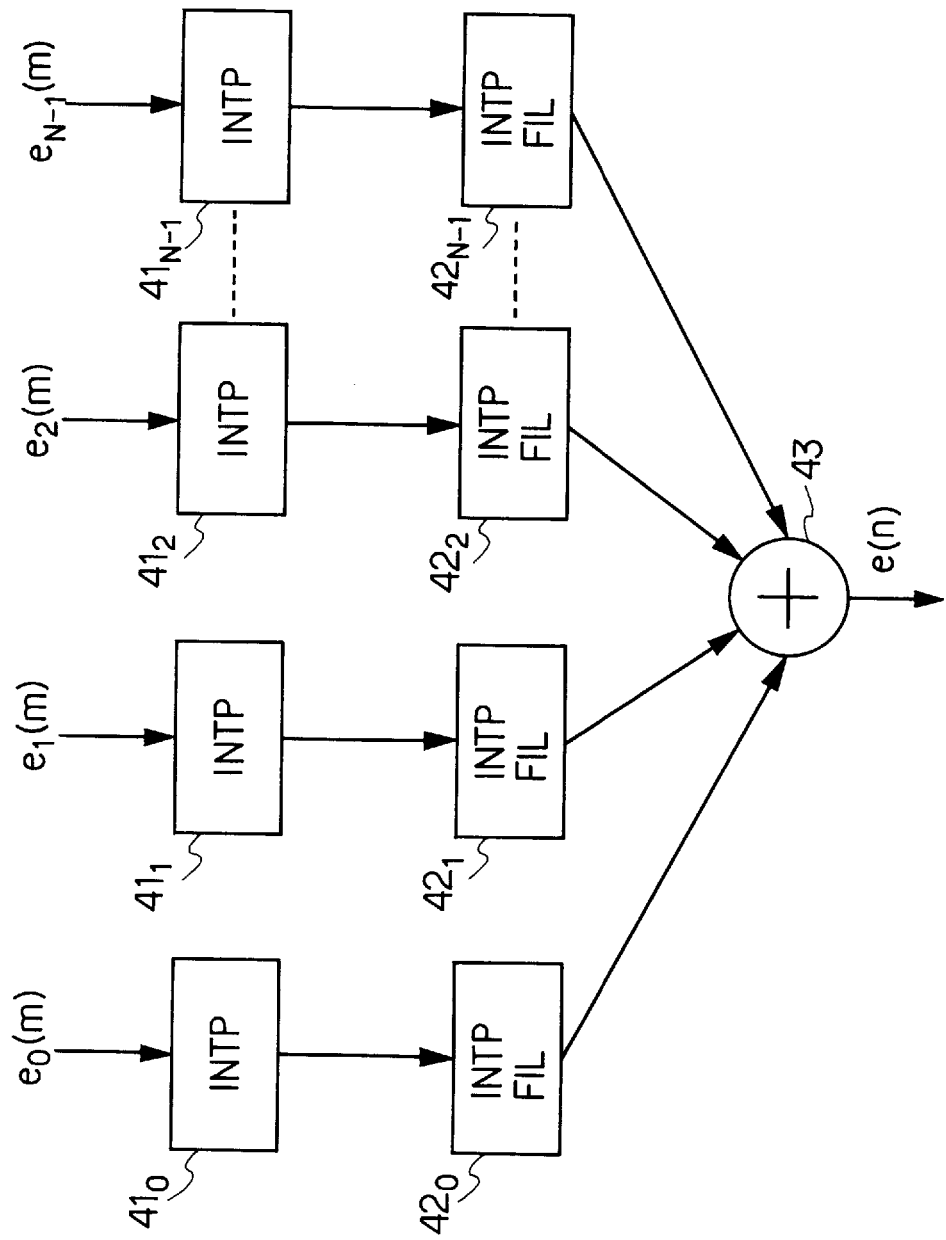
FIG. 4 is a block diagram showing the internal configuration of a subband synthesis part in FIG. 2.
Figure 7:
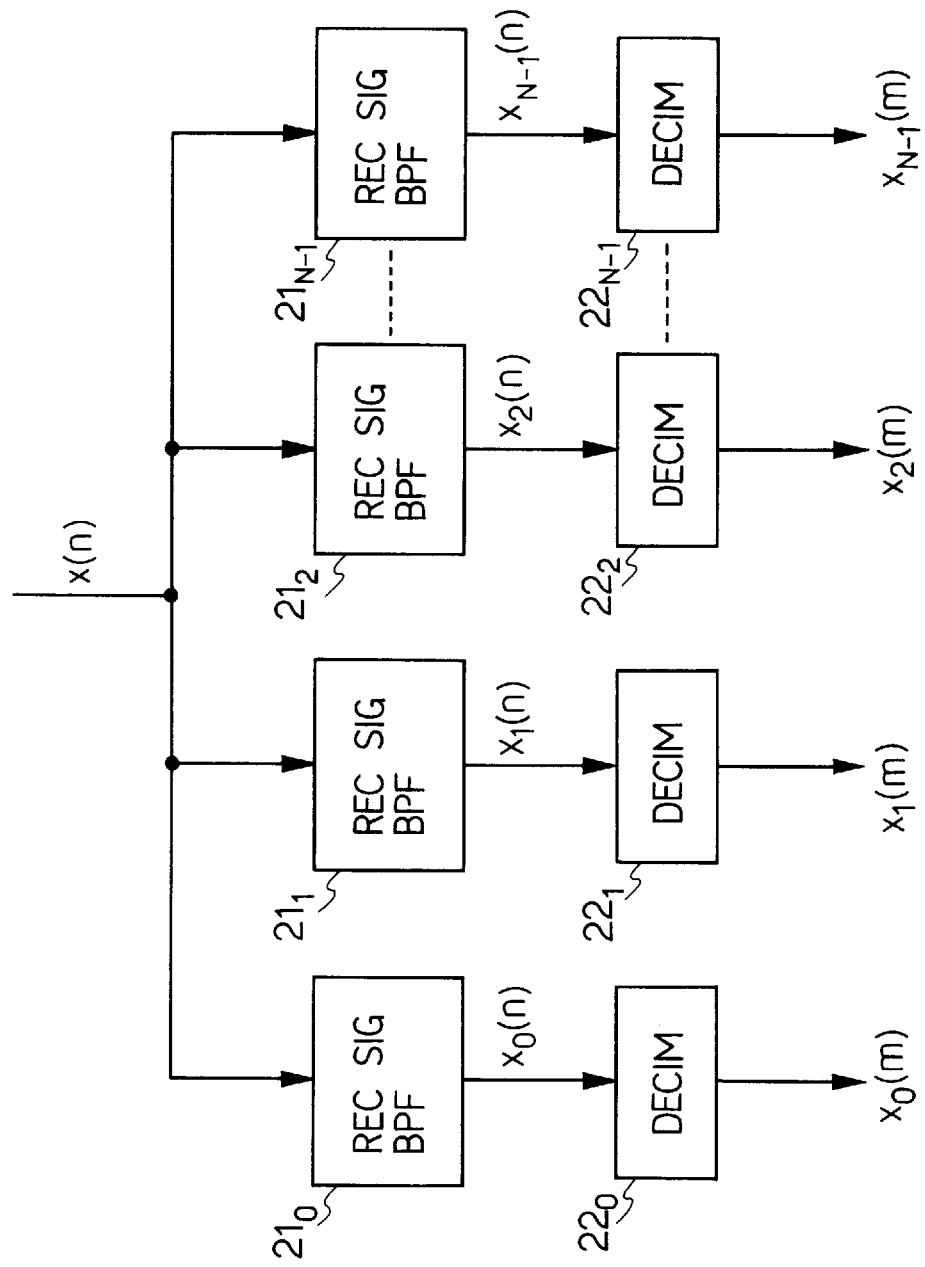
FIG. 7 is a block diagram showing the internal configuration of a received signal subband analysis part in the FIG. 6 embodiment.
Figure 8:
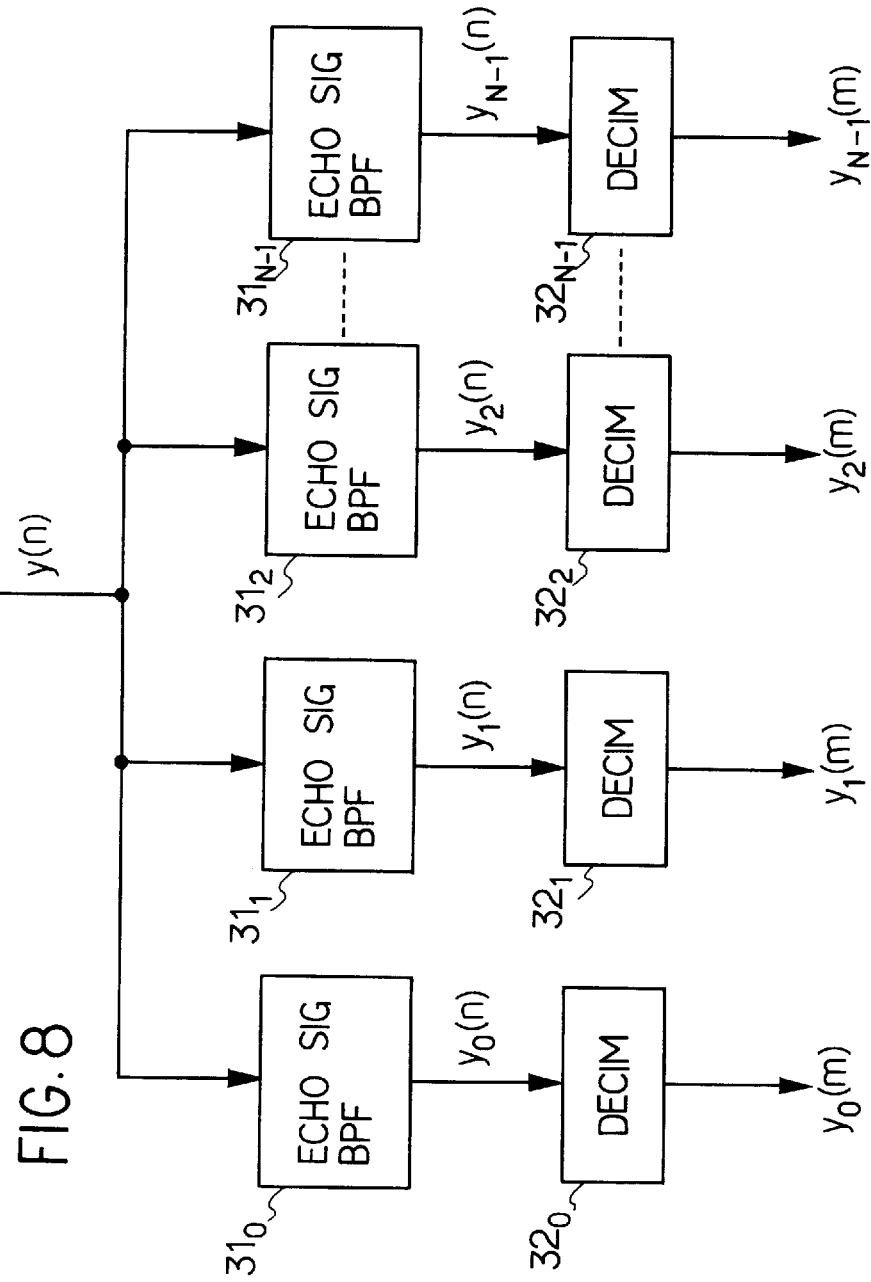
FIG. 8 is a block diagram illustrating the internal configuration of an echo signal subband analysis part in the FIG. 6 embodiment.

FIG. 7 illustrates in block form the internal configuration of the received signal subband analysis part 20 in the first embodiment of FIG. 6. Reference numeral $21_k$ denotes a band-pass filter for the received signal, which has its filter length set to be smaller than that of the band-pass filter length for the echo signal as described above, band-limits the received signal to a predetermined band and output it as a received signal $x_k(n)$. Reference numeral $22_k$ denotes a decimation part, which decimates the subband received signal $x_k(n)$ at the decimation ratio R and outputs a signal $x_k(m)$. FIG. 8 illustrates in block form the internal configuration of the echo signal subband analysis part 30. Reference numeral $31_k$ denotes a band-pass filter for the echo signal, which band-limits the echo signal y(n) and outputs it as a subband echo signal $y_k(n)$. Reference numeral $32_k$ denotes a decimation part, which decimates the subband echo signal $y_k(n)$ at the decimation ratio R and outputs a signal $y_k(m)$. Here, k=0,1, . . . ,N−1. The subband synthesis part 40 is identical in construction with that shown in FIG. 4.

Figure 9:
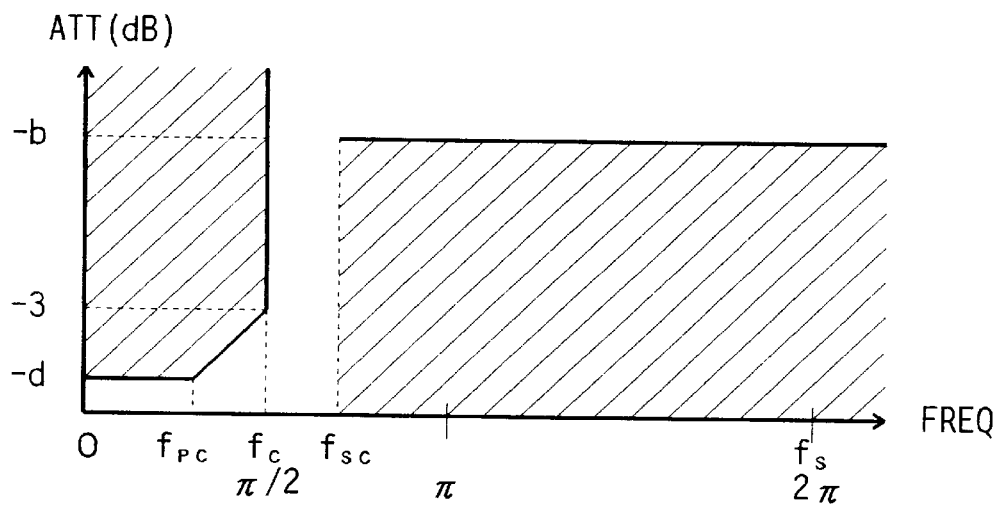
FIG. 9 is a graph schematically showing a band-pass filter.

FIG. 9 schematically shows the attenuation characteristic of the band-pass filter ($21_k$, $31_k$) for use in the received signal subband analysis part 20 and the echo signal subband analysis part 30. Reference character $f_{pc}$ denotes the pass-band cutoff frequency, $f_{sc}$ the stop-band cutoff frequency, fc the cutoff frequency, b the stop-band attenuation and d the pass-band attenuation. The band from 0 to $f_{pc}$ indicates the pass band, the band from $f_c$ to $f_{sc}$ the transition band, the band above $f_{sc}$ the stop band, and 0 to $f_c$ the bandwidth. In this case, $f_c = f_s/M$, where $f_s$ represents the sampling frequency of the A/D converter 18X or 18Y. The band-pass filter $21_k$ or $31_k$ is so set as to provide an attenuation d below 3 dB in the pass band from 0 to the pass-band cutoff frequency $f_{pc}$ and a predetermined attenuation b in the stop band above the stop-band cutoff frequency $f_{sc}$ as shown in FIG. 9. In the first embodiment, the attenuation b of the received signal band-pass filter $21_k$ at frequencies higher than the stop-band cutoff frequency $f_{sc}$ is chosen to be smaller than the attenuation b of the echo signal band-pass filter $31_k$.

Figure 10:
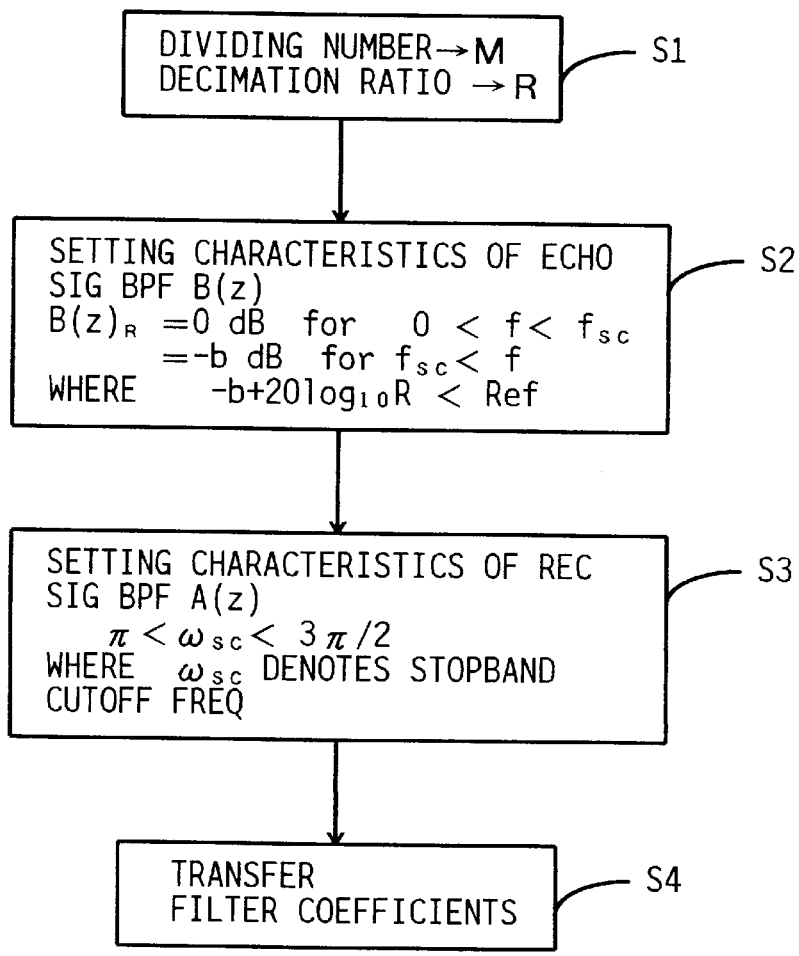
FIG. 10 is a flowchart for setting the characteristic of the band-pass filter.

FIG. 10 is a flowchart for setting the band-pass filter characteristic in the filter characteristic setting part 50.

In step Si the dividing number M and the decimation ratio R are input.

In step S2 the characteristic B(z) of the echo signal band-pass filter is set. The characteristic B(z) of each band-pass filter in the echo signal subband analysis part 30 is set so that the attenuation at frequencies higher than the stop-band cutoff frequency $f_{sc}$ exceeds a predetermined value b dB in the characteristic obtained after the decimation of taps of the filter at the decimation ratio R. Letting a speech quality proving value be represented by Ref, the value of the attenuation b is predetermined as a minimum attenuation that satisfies the following inequality:

$$-b+20\ \log_{10} R < Ref. \quad (1)$$

And the filter characteristic B(z) of the band-pass filter $31_k$ is determined as follows:

$$B(z) = -d(\text{dB}),\ 0 \le d \le 3 \text{ for } 0 < f < f_{sc} \le -b(\text{dB}) \text{ for fsc} < f \quad (2)$$

The speech quality proving value Ref is one that determines the quantity of aliasing relative to speech; for example, it is set to −40 dB.

In step S3 the attenuation of the band-pass filter characteristic A(z) in the received signal subband analysis part 20 is set so that it is smaller than the attenuation of the band-pass filter characteristic B(z) in the echo signal subband analysis part 30. In this instance, letting the stop-band cutoff frequency of the filter characteristic A(z) be represented by $\omega_{sc}$ (a rated frequency), the attenuation of the band-pass filter in the received signal subband analysis part 20 is selected such that the stop-band cutoff frequency $\omega_{sc}$ is in the following range:

$$P < \omega_{sc} < 3\pi/2 \quad (3)$$

In step S4, band-pass filter coefficients are transferred to the echo signal subband analysis part 30 and the received signal subband analysis part 20, respectively.

Figure 11:
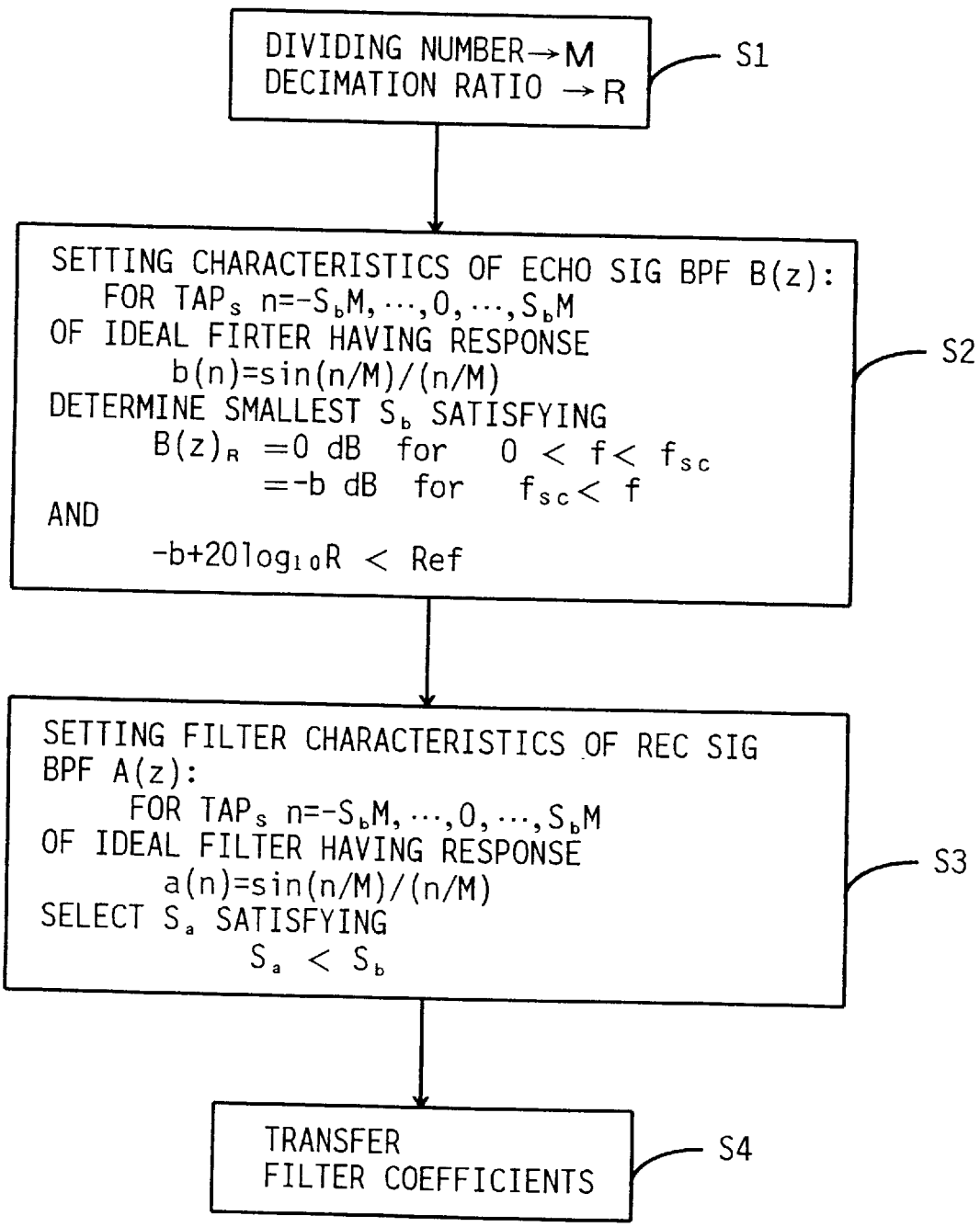
FIG. 11 is another flowchart for setting the band-pass filter characteristic.

FIG. 11 is a flowchart for obtaining the band-pass filter characteristic from the filter length.

In step Si the dividing number M and the decimation ratio R are input.

Figure 12:
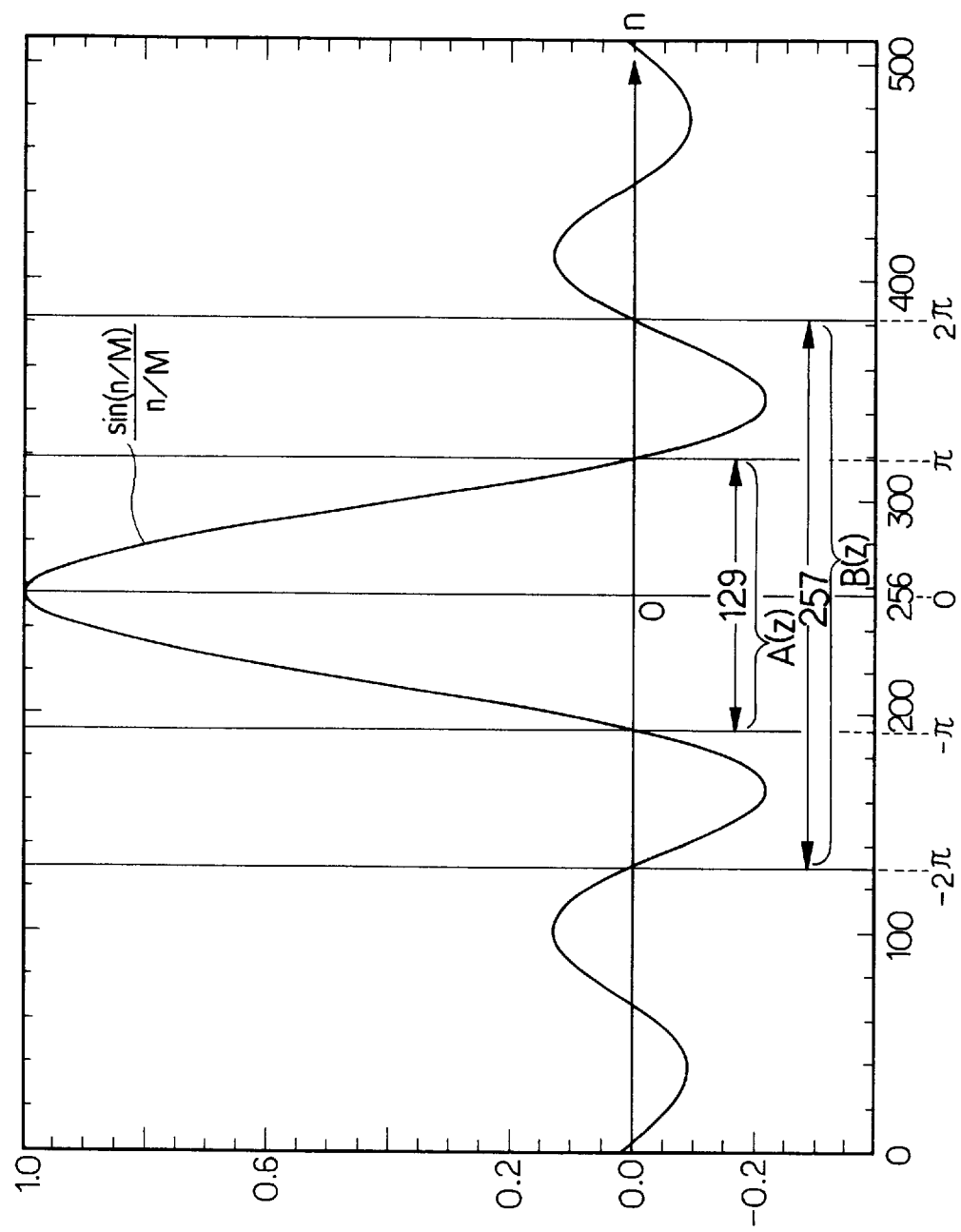
FIG. 12 is a graph showing part of the impulse response of an ideal band-pass filter.

In step S2 the characteristic B(z) of each echo signal band-pass filter is set. The band-pass filter coefficient $S_b$ (a positive integer) of the echo signal subband analysis part 30 is set so that the attenuation at frequencies higher than the stop-band cutoff frequency fsc exceeds the predetermined value b dB in the characteristic obtained after decimating the taps of the band-pass filter at the decimation ratio R. FIG. 12 shows the impulse response b(n)=sin(n/M)/(n/M) in the range from tap 0 to 500. Letting the taps of the echo signal band-pass filter of the characteristic B(z) be represented by $-S_b M, \ldots, 0, \ldots, S_b M$, the smallest filter coefficient $S_b$ is determined that satisfies the following equation as is the case with the aforementioned Eqs, (1) and (2):

$$-b+20\ \log_{10} R < Ref$$

$$B(z) = -d,\ 0 \le d \le 3 \text{ for } 0 < f < \text{fsc} \le -b\ f_{sc} < f$$

More specifically, the value of the filter coefficient $S_b$ is incremented one by one, a check is made to see if each value satisfies the above equation, and the value $S_b$ which satisfies the equation first is set as the smallest filter coefficient $S_b$. For example, the filter coefficient $S_b$ is set at 2 as shown in FIG. 12 and the echo signal band-pass filter B(z) is formed by a filter that has 257 (n=−128 to +128) taps.

In step S3 the band-pass filter length in the received signal subband analysis part 20 is set to be shorter than the band-pass filter length in the echo signal subband analysis part 30. That is, the taps $-S_a M, \ldots, S_a M$ of the received signal band-pass filter A(z) are selected so that $S_a M < S_b M$ with respect to the impulse response a(n)=sin(n/M)/(n/M) of the ideal band-pass filter. A filter with 129 taps (n=−64 to +64) is used as the band-pass filter A(z) for the received signal because the number of its taps may preferably be about half of the number of taps 257 of the echo signal band-pass filter B(z).

In step S4 the filter coefficients thus selected are transferred to the echo signal subband analysis part 30 and the received signal subband analysis part 20, respectively.

With the combined use of these schemes, the characteristic of the received signal after being divided into subbands is made substantially flat, so the frequency characteristic flattening part 9k can be implemented on a small scale.

Figure 13:
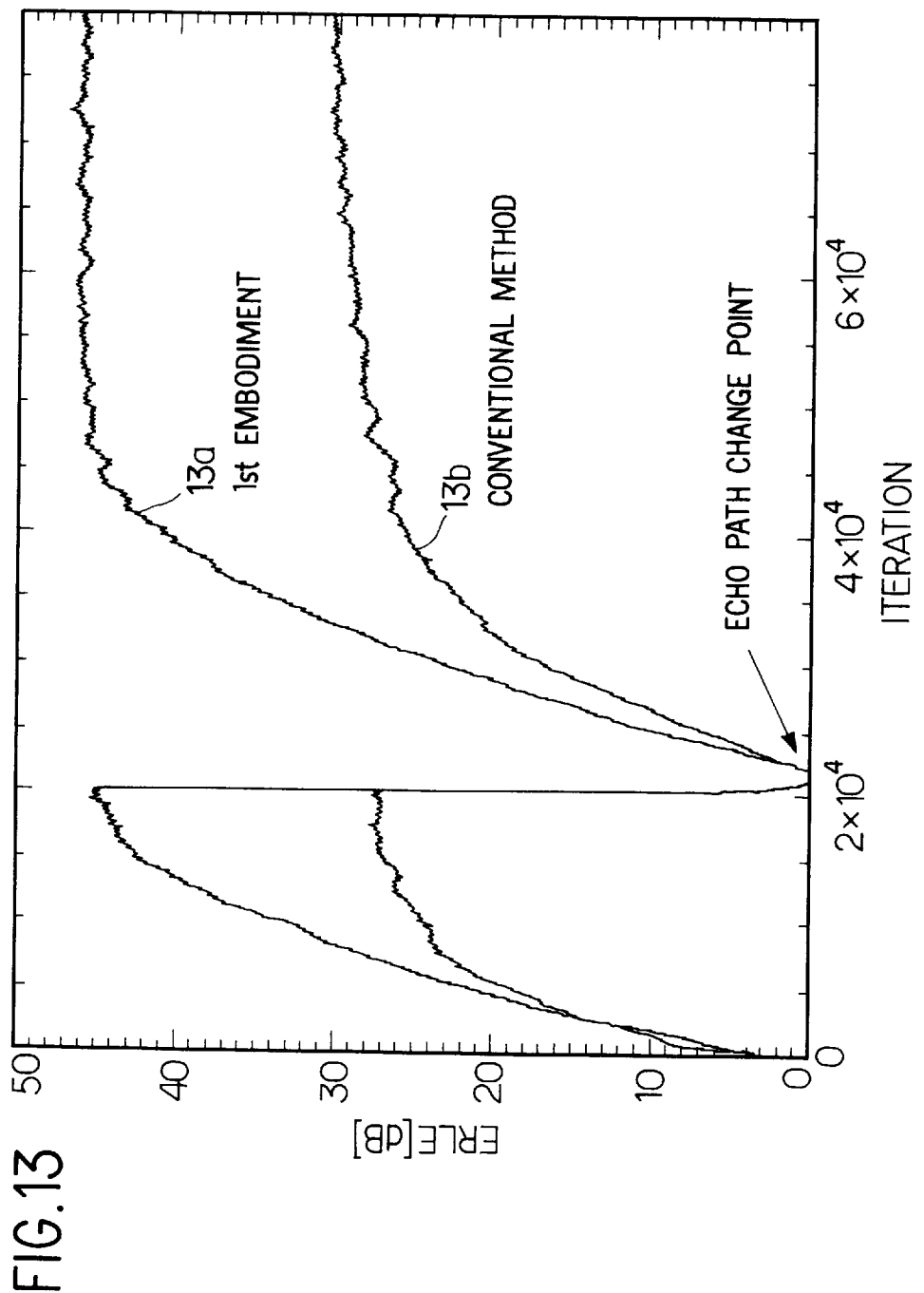
FIG. 13 is a diagram showing ERLE simulation results to demonstrate the effectiveness of the first embodiment in contradistinction to the prior art.

FIG. 13 is a graph showing the results of computer simulation of the convergence performance of the present invention. In the computer simulation, a measured impulse response of the echo path EP (1280 taps, sampling frequency 16 kHz) was used. The band dividing number M is 64 and the decimation ratio R is 32. The number of taps, $L_k$, of the adaptive filter which forms the estimated echo path $15_k$ of each subband is 44. A white noise was used as the received signal. The curve 13a indicates the ERLE in the first embodiment and the curve 13b the ERLE in the prior art. It will be appreciated from FIG. 13 that the convergence performance was improved as compared with that in the case where the same filter length is used in both the received signal subband analysis part 20 and the echo signal subband analysis part 30.

Figure 5C:
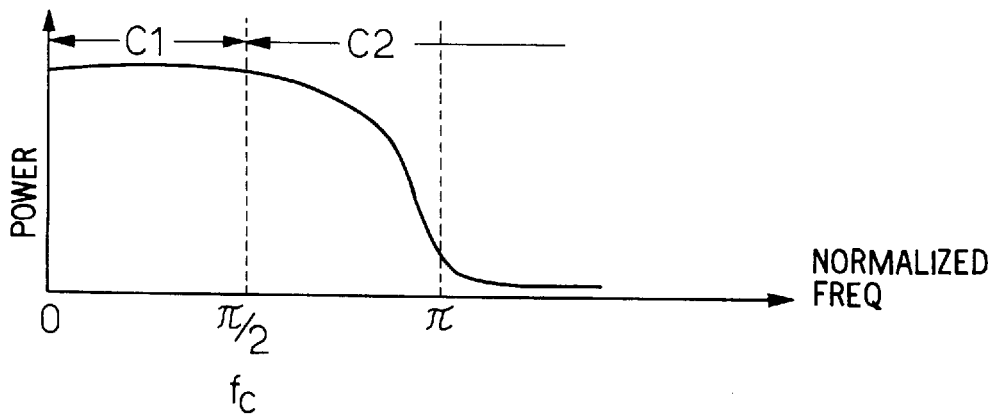
FIG. 5C is a graph showing the frequency characteristic of an echo signal estimated by an echo path estimation part.

In the first embodiment, as described above, by setting the filter length of the band-pass filter $31_k$ in the echo signal subband analysis part 30 to be larger than the filter length of the band-pass filter $21_k$ in the received signal subband analysis part 20, the stop-band attenuation of the former is set to be larger than that of the latter. The first embodiment is intended to produce the same effect as in the case of band-limiting the echo path, by setting the filter characteristics of each band-pass filter for the received signal and each band-pass filter for the echo signal so that the stop-band attenuation of the latter is larger than that of the former. In other words, both filters are equivalently given such characteristics that the lower level portion C2 of the echo signal in FIG. 5C is estimated from the portion A2 of the subband received signal indicated by the solid line in FIG. 5A, and the higher level portion Cl of the echo signal in FIG. 5C is estimated from the higher level portion Al of the solid-lined signal in FIG. 5A. Hence, in the echo path of each subband to be estimated, the lower level portion of the received signal needs only to be used for the estimation of the lower level portion of the echo signal. The time necessary for the estimation with a required accuracy in each subband depends mainly on the estimation of the portion of the higher signal level. As a result, the estimation accuracy depends mainly on that of the signal portion Cl as a whole and the overall convergence speed is increased. Accordingly, this embodiment offers a subband acoustic echo canceller of improved convergence performance.

SECOND EMBODIMENT

The first embodiment has been described above to whiten the subband received signal by reducing the attenuation in the stop band by setting the filter length for the received signal to be smaller than that for the echo signal. In contrast to this, in the second embodiment the subband received signal, which is applied to the subband echo path estimation part, is subjected to filtering so that its frequency characteristic is flattened over the frequency range from the pass band to the stop band.

Figure 14:
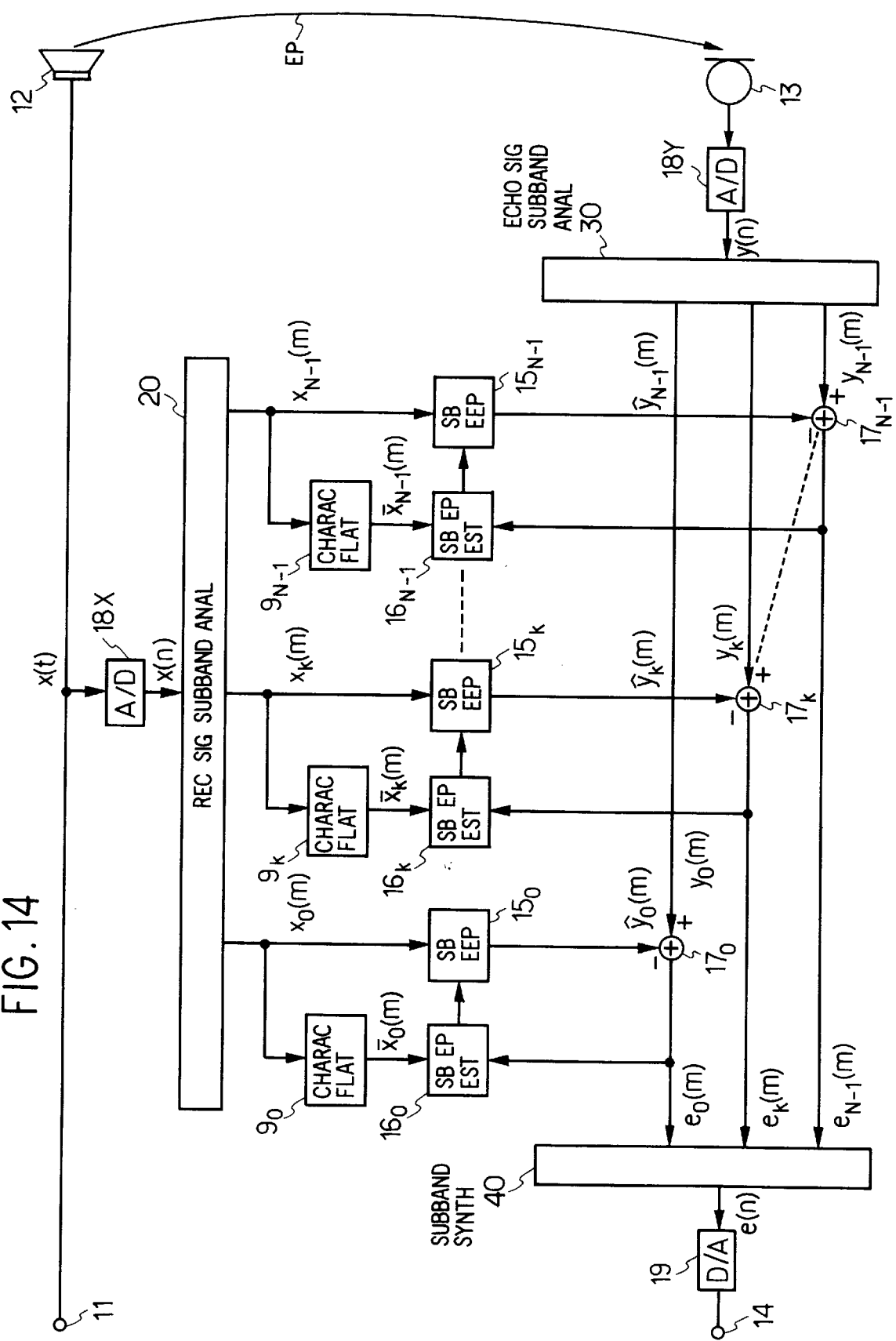
FIG. 14 is a block diagram of a subband acoustic echo canceller according to a second embodiment of the present invention.

FIG. 14 illustrates the subband acoustic echo canceller according to the second embodiment of the present invention. The parts corresponding to those in FIG. 6 are identified by the same reference numerals. Reference numeral $9_k$ (where k=0,1, ... ,N-1) denotes a frequency characteristic flattening part for flattening the frequency characteristic of the subband received signal. The received signal x(n) from the A/D converter 18X is divided by the received signal subband analysis part 20 into N subbands. Each subband signal $x_k(m)$ thus divided is input into the subband estimated echo path $15k$ and the frequency characteristic flattening part $9_k$ provided for each subband. The frequency characteristic flattening part $9_k$ flattens the subband signal xk(m) of the frequency characteristic indicated by the broken line in FIG. 5A. The resulting flattened signal $\overline{X}_{K(m)}$ is input into the subband echo path estimation part $16_k$ for the estimation of the transfer function h/(i) of the corresponding subband estimated echo path $15_k$.

The frequency characteristic flattening part $9_k$ can be implemented by an FIR (finite impulse response) or IIR (infinite impulse response) filter of a tap number $L_T$ which has an inverse characteristic of the band-pass filter $21_k$.

A description will be given first of the frequency characteristic flattening part $9_k$ formed by the FIR filter. The characteristic of the FIR filter is expressed as follows:

$$G(z) = \sum_{n=0}^{L-1} g_n z^{-n} \quad (4)$$

The flattened signal $\overline{X}_k(m)$, which is the output from this filter, is expressed by the following equation:

$$\overline{x}_k(m) = \sum_{n=0}^{L-1} g_n x_k(m-n) \quad (5)$$

Letting this filter characteristic be represented by G(z), the filter coefficient $g_n$ is given by the following equation:

$$G(z) = F(z)/[F^*(z)F(Z)+\delta] \quad (6)$$

where F(z) is a characteristic that is obtained after the taps of the band-pass filter $21_k$ (see FIG. 7) used in the received signal subband analysis part 20 is decimated at the same decimation ratio R as that of the decimation part $22_k$, δ is a stabilization constant and * is a complex conjugate.

Alternatively, setting $$g_0 = 1$$

$$G(z) = 1 + \sum_{n=1}^{L-1} g_n z^{-n} \quad (7)$$

the filter coefficient $g_n$ can be obtained which minimizes the mean squared value of e(k) given by the following equation:

$$e(k) = f(k) + \sum_{n=1}^{L-1} g_n z^{-1} \quad (8)$$

Figure 15A:
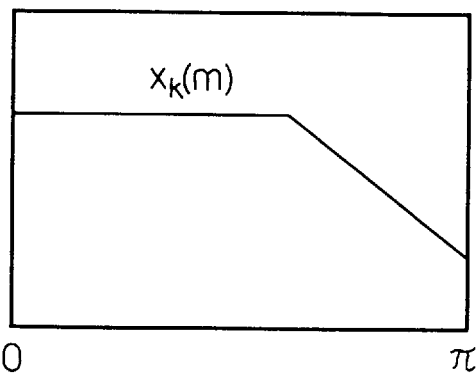
FIG. 15A is a graph schematically showing the frequency characteristic of a subband received signal.
Figure 15B:
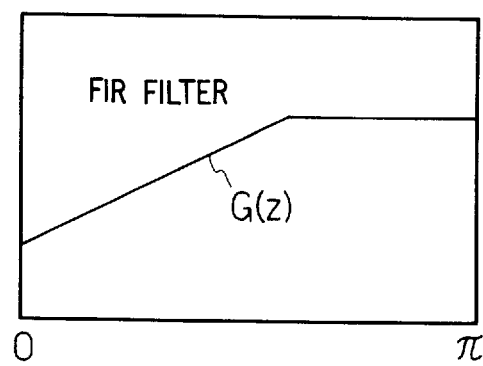
FIG. 15B is a graph schematically showing the characteristic of an FIR filter for flattening the subband received signal.
Figure 15C:
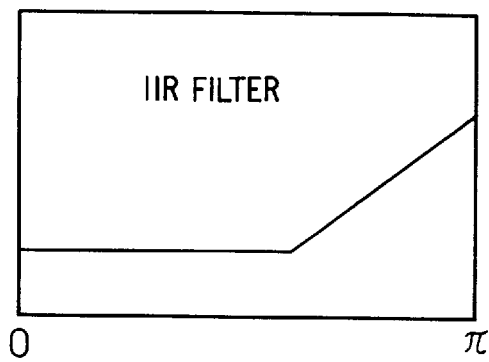
FIG. 15C is a graph schematically showing the characteristic of an IIR filter for flattening the subband received signal.
Figure 15D:
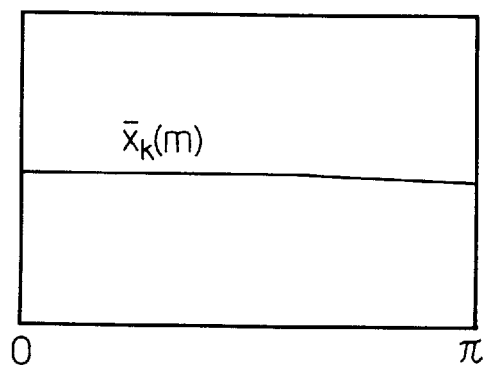
FIG. 15D is a graph schematically showing a flattened subband received signal.

FIGS. 15A through 15D shows the concept of flattening of the received signal by the frequency characteristic flattening part $9_k$. FIG. 15A shows the frequency characteristic of the received signal $x_k(m)$ which is input into the frequency characteristic flattening part $9_k$; FIG. 15B shows the filter characteristic G(z) when the frequency characteristic flattening part $9_k$ is formed by an FIR filter; and FIG. 15D shows the frequency characteristic of the output signal $\overline{x}_k(m)$ from the frequency characteristic flattening part $9_k$. The output signal $x_k(m)$ from the received signal subband analysis part 20 has the frequency characteristic shown in FIG. 15A, and by convoluting this signal with an FIR filter of the frequency characteristic depicted in FIG. 15B, the signal $\overline{x}_k(m)$ is obtained which has the flattened frequency characteristic shown in FIG. 15D.

Next, a description will be given of the case where the frequency characteristic flattening part $9_k$ is formed by an IIR filter. The formation of the frequency characteristic flattening part $9_k$ by the IIR filter means the generation of the characteristic-flattened signal $\overline{x}_k(m)$ that is given by the following equations:

$$\overline{x}_k(m) = \sum_{n=1}^{L-1} w_n \overline{x}_k(m-n) + x_k(m) \quad (9)$$

$$W(z) = C/\left\{ 1 - \sum_{n=1}^{L-1} w_n z^{-n} \right\} \quad (10)$$

The filter coefficient $w$, can be obtained as $w_n = f_n/f_0$ when the filter characteristic, which is obtained after the taps of the band-pass filter $21_k$ of the received signal subband analysis apart 20 is decimated at the same decimation ratio as that of the decimation part $22_k$, is set as follows:

$$F(z) = \sum_{n=1}^{L-1} f_n z^{-n} \quad (11)$$

Where the filter characteristic F(z) has a non-minimum phase zero point, the filter coefficient $w_n$ is obtained as $w_n = f_n'/f_0$ ' that is obtained after the filter characteristic F(z) is converted to a minimum phase function. Alternatively, the filter coefficient $w_n$ is selected such that the signal $\overline{x}_k(m)$ has a flat characteristic when $x_k(m)$ is replaced with f(m) in Eq. (9).

FIG. 15C shows the frequency characteristic when the frequency characteristic flattening part $9_k$ is formed by the IIR filter. The output signal xk(m) from the received signal subband analysis part 20 has the frequency characteristic depicted in FIG. 15A. By convoluting this signal with the IIR filter having the frequency characteristic shown in FIG. 15C, the signal $\overline{x}_k(m)$ of the flattened frequency characteristic shown in FIG. 15D is obtained.

Figure 16:
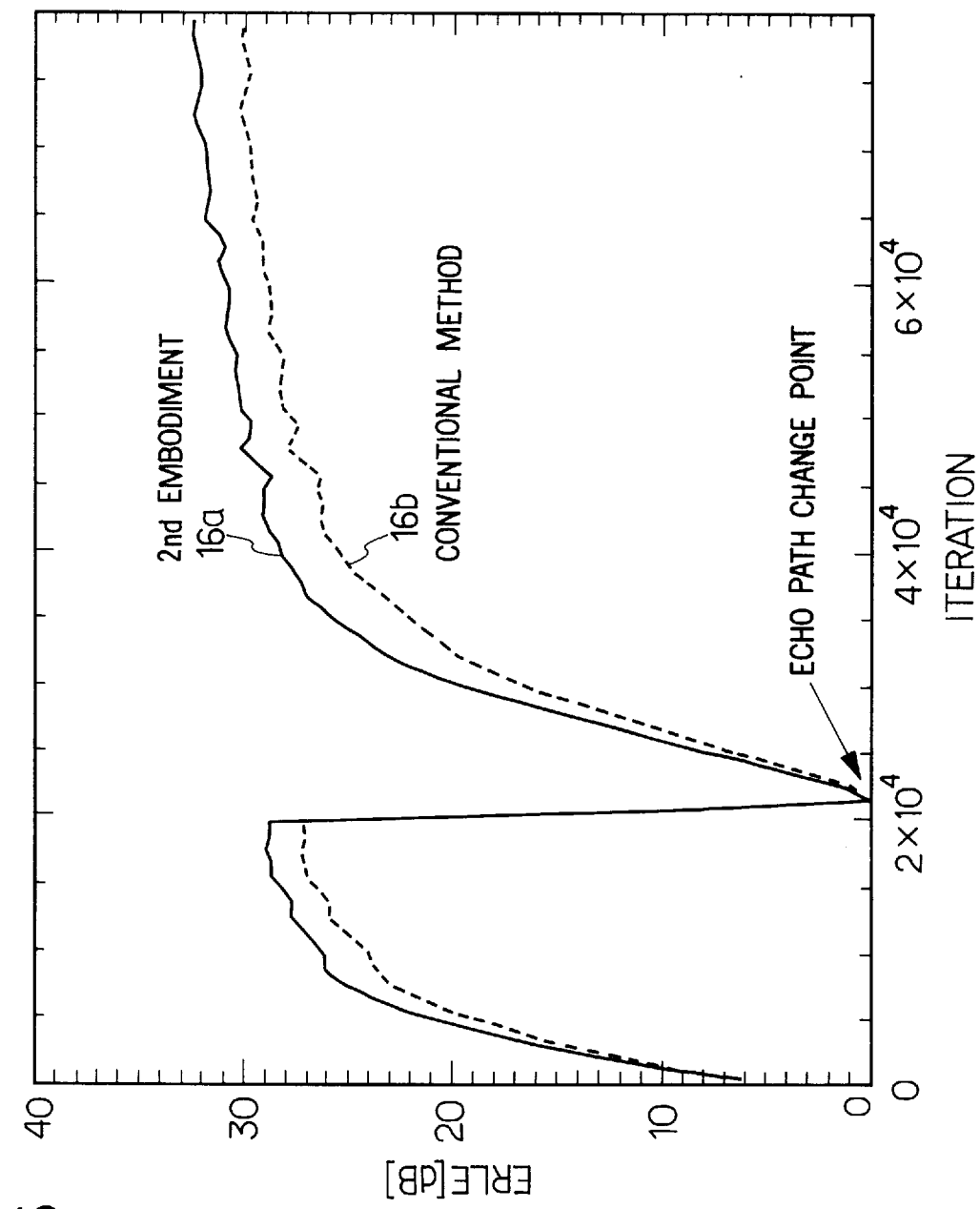
FIG. 16 is a graph showing the ERLE obtained with the second embodiment in comparison with that of the prior art.

FIG. 16 shows computer simulation results on the ERLE characteristics with a view to demonstrating the effectiveness of the second embodiment shown in FIG. 14, the solid line 16a indicating the ERLE by the second embodiment and the broken line 16b the ERLE by the prior art. The simulation was done on the assumption that the band-pass filters for the received signal and the echo signal have an equal number of taps as in the prior art. In the simulations a measured echo path impulse response (1280 taps and 16 kHz sampling frequency) was used, the dividing number M was 64, the decimation ratio R was 32, and the number of taps $L_k$ of each subband adaptive filter $15_k$ was 40. A 16th-order FIR filter was used as the frequency characteristic flattening part $9_k$. The use of the frequency characteristic flattening part 9k apparently increased the convergence speed.

Figure 17:
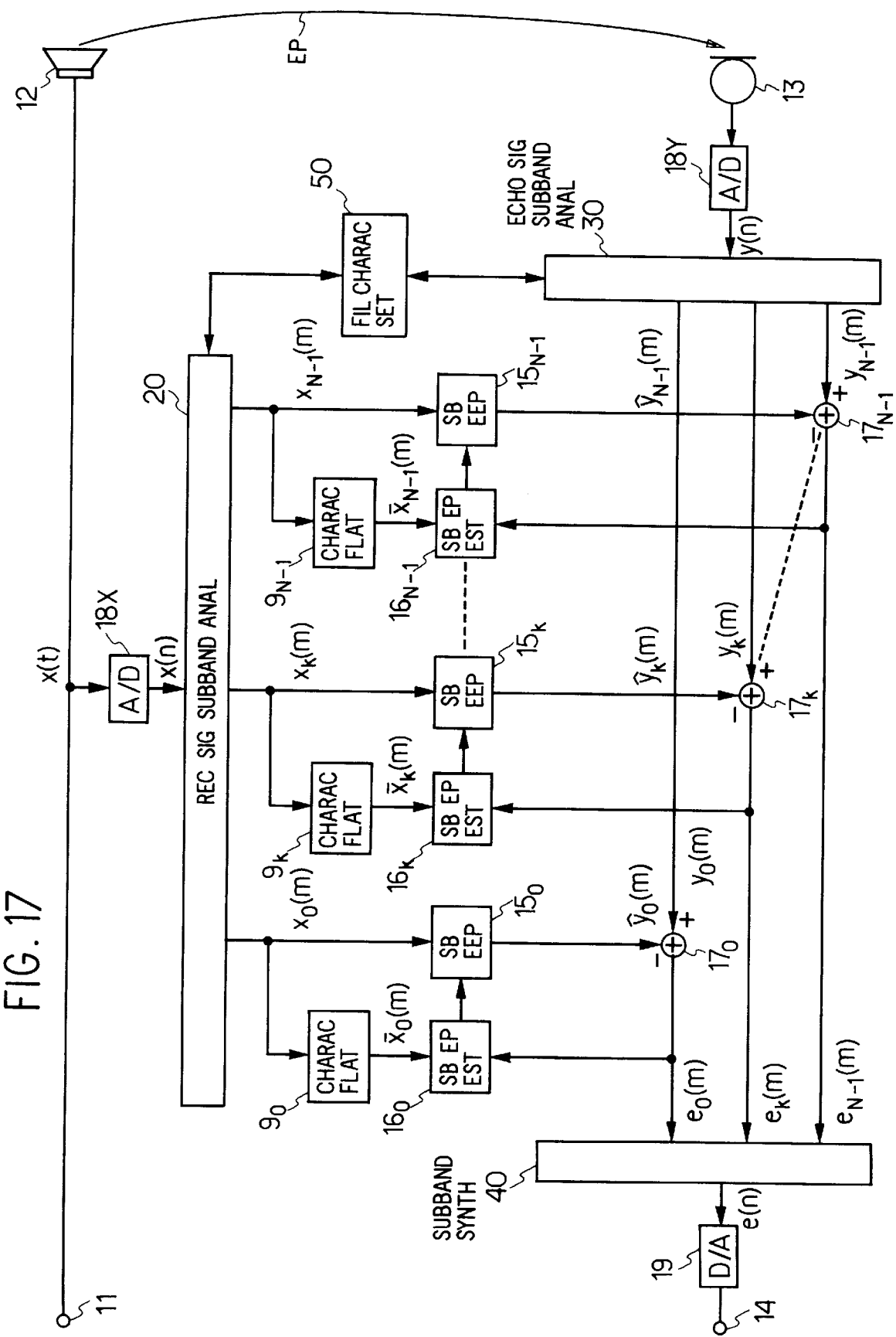
FIG. 17 is a block diagram illustrating a subband acoustic echo canceller which combines the first embodiment with the second one.

FIG. 17 illustrates a modified form of the subband acoustic echo canceller of the second embodiment with which the band-pass filter characteristic setting part 50 in the first embodiment is combined. The parts corresponding to those in FIG. 14 are identified by the same reference numerals. In FIG. 17, reference numeral 50 denotes a filter characteristic setting part, 20 a received signal subband analysis part and 30 an echo signal subband analysis part. Since these parts are the same as described previously with respect to the first embodiment, no description will be repeated.

Figure 18:
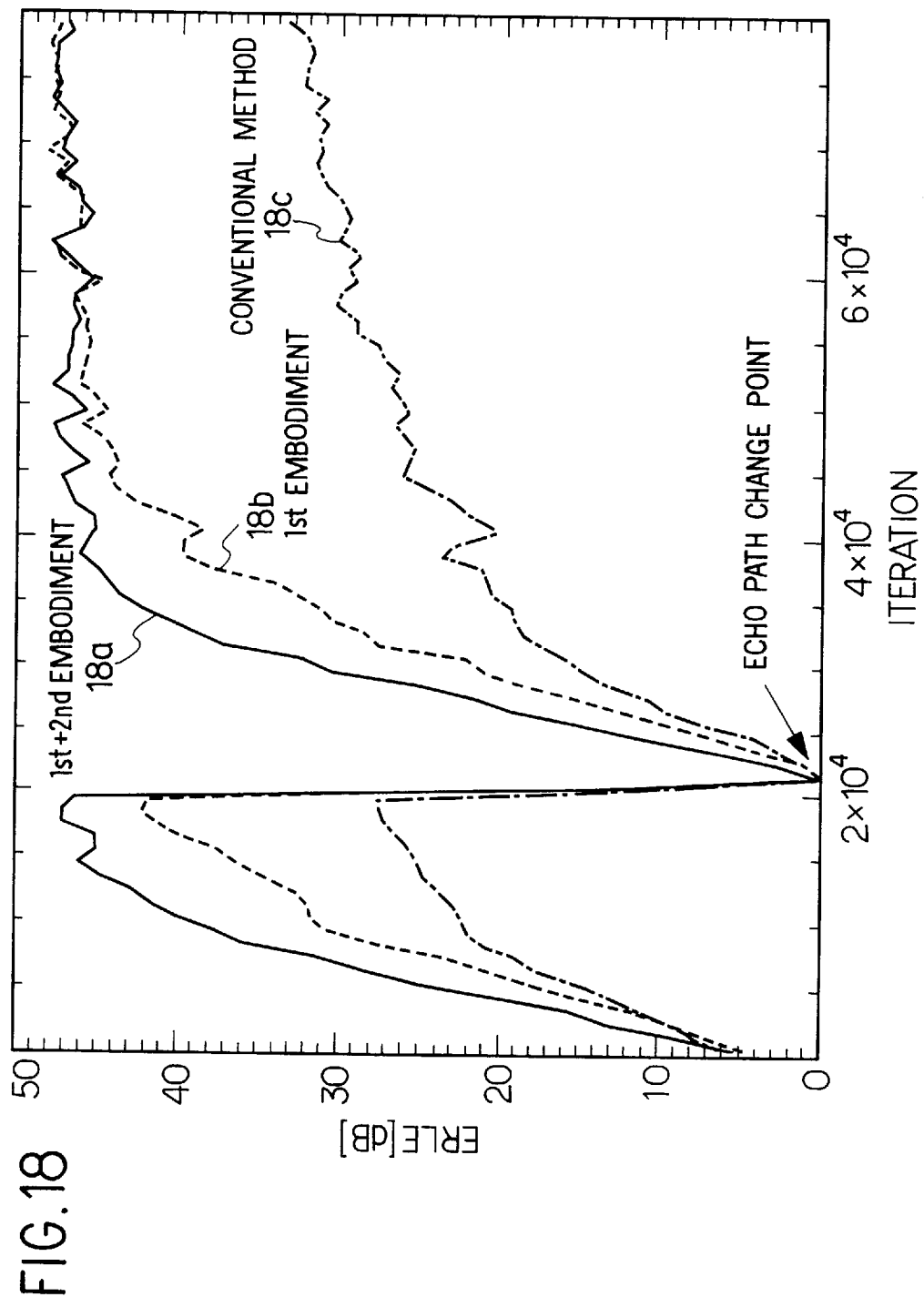
FIG. 18 is a graph showing the ERLE obtained with the FIG. 17 embodiment in contradistinction to those of the prior art and the first embodiment of the invention.

FIG. 18 is a graph showing ERLE obtained by computer simulations done for demonstrating the effectiveness of the echo canceller of FIG. 17, the solid line 18a indicating the ERLE characteristic by the FIG. 17 embodiment. For comparison, the broken line 18b and the one-dot-chain line 18c show the ERLE obtained by the first embodiment and the prior art, respectively. In the simulations a measured impulse response (1280 taps and 16 kHz sampling frequency) was used. The dividing number M was 64 and the decimation ratio R was 32. The number of taps in each subband was 44. The transmission signals used in the simulations were speech uttered by a male and a female speaker 50 times. With the configuration of FIG. 17, the convergence speed was apparently higher than in the case of FIG. 14.

THIRD EMBODIMENT

FIG. 19 illustrates in block form a third embodiment of the present invention in which the subband acoustic echo canceller of the second embodiment is applied to a multi-channel system. While in FIG. 19 there is shown a system using two loudspeakers and two microphones, the invention is similarly applicable to a system using more loudspeakers and microphones. Reference numerals 61a and 61b denote vector concatenating parts, 11R and 11L right-and left-channel received signal input terminals, 12R and 12L right-and left-channel loudspeakers, 13R and 13L right-and left-channel microphones, 14R and 14L right- and left-channel transmission signal output terminals, and $EP_{LR}$, $EP_{LL}$, $EP_{RR}$ and $EP_{RL}$ echo paths from the loudspeakers 12R and 12L to the microphones 13R and 13L. Reference numeral 10R denotes a right-channel echo cancelling part, which is identical in construction with the first embodiment of FIG. 6 and hence is composed of N subband estimated echo paths $15_0$ to $15_{N-1}$, N subband estimation parts $16_0$ to $16_{N-1}$ and N subband subtractors $17_0$ to $17_{N-1}$. Reference numeral 10L denotes a left-channel echo cancelling part, which is identical in construction with the right-channel echo cancelling part 10R.

Right- and left-channel received signals $x_R(n)$ and $x_L(n)$ are divided by subband analysis parts 20R and 20L into N signals $x_{Rk}(m)$ and $x_{Lk}(m)$, respectively. The thus divided signals $x_{Rk}(m)$ and $x_{Lk}(m)$ of the two channels are applied to frequency characteristic flattening parts 9R and 9L and the vector concatenating part 61b. The signals $x_{Rk}(m)$ and $x_{Lk}(m)$ fed to the frequency characteristic flattening parts 9R and 9L are flattened into signals $\bar{x}_{Rk}(m)$ and $\bar{x}_{Lk}(m)$. The flattened signals $\bar{x}_{Rk}(m)$ and $\bar{x}_{Lk}(m)$ are vector-concatenated by the vector concatenating part 61a into a characteristic-flattened received signal concatenated vector $\bar{x}_k(m)$. The signal $x_{Rk}(m)$ and $x_{Lk}(m)$ fed to the vector concatenating part 61b are vector-concatenated into a received signal concatenated vector $x_k(m)$. Echo signals $y_R(n)$ and $Y_L(n)$ are also divided into N subband signals $y_{Rk}(n)$ and $y_{Lk}(M)$, respectively. The subband received signal concatenated vector $x_k(m)$, the subband characteristic-flattened received signal concatenated vector $\bar{x}_k(m)$ and the subband echo signal $Y_{Rk}(m)$ are provided to the echo cancelling part 10R, by which the echo picked up by the microphone 13R is cancelled. Similarly, the subband received signal concatenated vector $x_k(m)$, the subband characteristic-flattened received signal concatenated vector $\bar{k}_k(m)$ and the subband echo signal $y_{Lk}(m)$ are provided to the echo cancelling part 10L, by which the echo picked up the microphone 13L is cancelled.

FIG. 20 illustrates in block form a modified form of the subband acoustic echo canceller of the third embodiment, which is applied to a multichannel system and employs the filter characteristic setting part 50 used in the first embodiment. The parts corresponding to those in FIG. 19 are identified by the same reference numerals. In the first place, the band-pass filter characteristics of the received signal subband analysis parts 20R, 20L and the echo signal subband analysis parts 30R and 30L are set by the filter characteristic setting part 50. The right- and left-channel received signal $x_R(n)$ and $x_L(n)$ are divided by the received signal subband analysis part 20R and 20L into N subband signals $x_{Rk}(m)$ and $x_{Lk}(m)$, respectively.

The thus divided subband signals $x_{Rk}(m)$ and $x_{Lk}(m)$ of the two channels are applied to the frequency flattening parts 9R and 9L and the vector concatenating part 61b. The signals xRk(m) and xLk(m) fed into the frequency characteristic flattening parts 9R and 9L are flattened into signals $\bar{x}_{Rk}(m)$ and $\bar{x}_{Lk}(m)$. The flattened signals $\bar{x}_{Rk}(m)$ and $\bar{x}_{Lk}(m)$ are vector-concatenated by the vector concatenating part 61a into a characteristic-flattened received signal concatenated vector $\bar{x}_k(m)$. The signals $x_{Rk}(m)$ and $x_{Lk}(m)$ fed into the vector concatenating part 61b are vector-concatenated into a received signal concatenated vector $x_k(m)$. The echo signals $y_{Rk}(n)$ and $y_L(m)$ are also divided into N subband signals $y_{Rk}(m)$ and $y_{Lk}(m)$, respectively. The received signal concatenated vector $x_k(m)$, the characteristic-flattened received signal concatenated vector $\bar{x}_k(m)$ and the echo signal $y_{Rk}(M)$ in each subband are provided to the echo cancelling part 10R, by which the echo picked up the microphone 13R is cancelled. Likewise, the received signal concatenated vector $x_k(m)$, the characteristic-flattened received signal concatenated vector $\bar{x}_k(m)$ and the echo signal $y_{Lk}(m)$ in each subband are provided to the echo cancelling part 10L, by which the echo picked up by the microphone 13L is cancelled.

Figure 23:
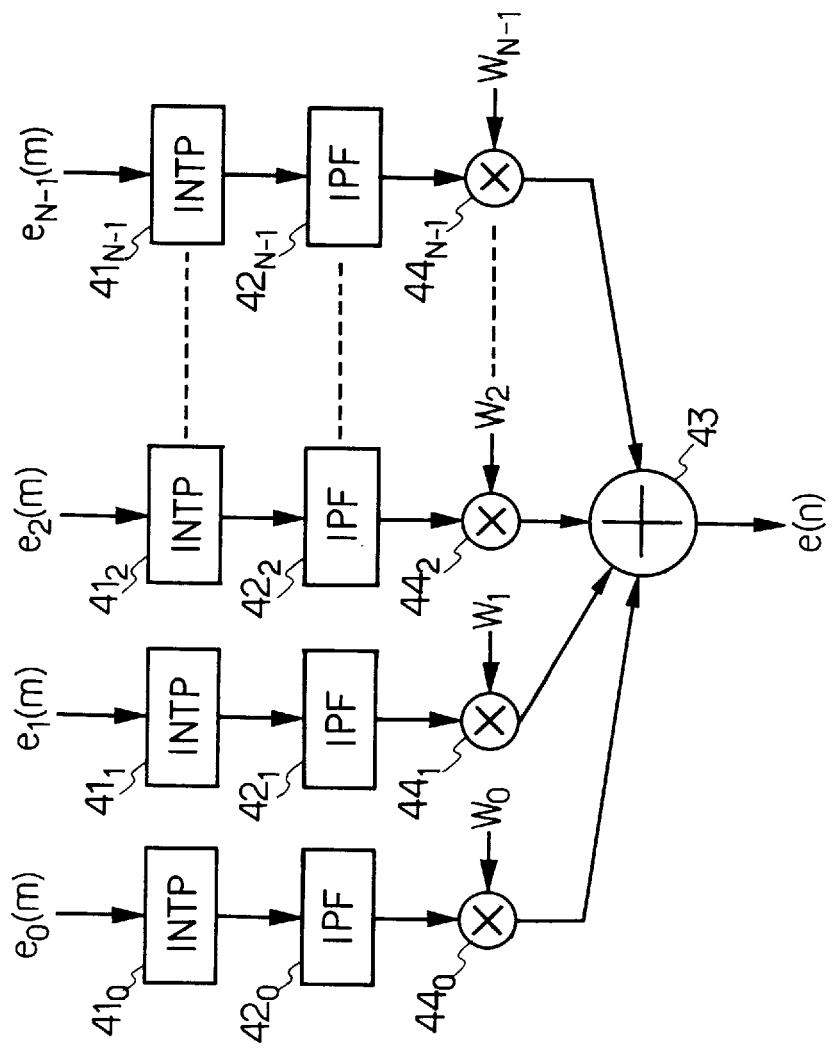
FIG. 23 is a block diagram illustrating the configuration of a subband synthesis part 40 which uses a common base band as subbands.

In the above embodiments the received signal and the echo signal are each divided by N band-pass filters. The subband received signal $x_k(m)$ can also be generated by such a method as shown in FIG. 21, in which the received signal and the echo signal are multiplied by N signals $W_k=e^{j2\pi k/M}$ (where k=0, ... ,N−1) by multipliers $23_k$ to shift their frequencies toward the low-frequency band in steps of k/M of the bandwidth, then the N signals are band-limited by low-pass filters $24_k$ of the same frequency characteristic and the thus band-limited signals are decimated by decimation parts $22_k$ at the decimation ratio R. As shown in FIG. 22, the echo signal subband analysis part 30 has also the same construction as in FIG. 21, which uses N multipliers $33_k$ to multiply the echo signal y(n) by N signals $W_k=e^{-j2\pi k/M}$ to shift their frequencies and applies the N multiplied signals via low-pass filters $34_k$ to decimation parts $32_k$ to obtain N subband echo signals $y_k(m)$. In this instance, the subband synthesis part 40 has such a construction as shown in FIG. 23, in which the error signals $e_k(m)$ applied thereto are interpolated by interpolation parts $41_k$ at an interpolation ratio R, the interpolates signals are band-limited by interpolation filters $42_k$, the band-limited signals are multiplied by signals $W_k=e^{-j2\pi k/M}$ (where k=0, ... ,N−1) by multipliers $44_k$ to shift their frequencies toward the high-frequency side in steps of k/M, and the frequency-shifted signals are added together by an adder 43 to obtain the full-band signal e(n). In this embodiment, the pair of the multiplier $23_k$ for the frequency shift and the low-pass filter $24_k$ in FIG. 21 corresponds to the band-pass filter $21_k$ in FIG. 7. Similarly, the pair of the multiplier $33_k$ and the low-pass filter $34_k$ in FIG. 22 corresponds to the band-pass filter $31_k$ in FIG. 8. The low-pass filters $24_k$ and $34_k$ can be regarded as a kind of band-pass filters. By the application of the configurations of FIGS. 21, 22 and 23 to each of the afore-described embodiments, too, the stop-band attenuation of the low-pass filter for the received signal $x_k(m)$ is made smaller than the stop-band attenuation of the low-pass filter for the echo signal. One possible method therefor is to choose the number of taps of the low-pass filter $21_k$ for the received signal $x_k(m)$ to be smaller than the number of taps of the low-pass filter $31_k$ for the echo signal, preferably about ½.

In the embodiment of the present invention described above, any of a variety of conventional LMS algorithms and other adaptive algorithms can be used as the adaptive algorithm for estimating (i.e. iteratively updating) the transfer function of the adaptive filter that forms the subband estimated echo path $15k$. A projection algorithm is also counted among them.

EFFECT OF THE INVENTION

It is known in the art that the convergence speed of the adaptive filter decreases when a speech signal or similar colored signal is provided as the input signal in the above-described embodiments. A solution to this problem is to use a projection algorithm that improves the convergence speed by removing the auto-correlation of the input signal. In the case of applying the projection scheme to the conventional subband acoustic echo canceller, the influence of the band-pass filter is also removed by the projection scheme. In contrast to this, according to the present invention, the calculation complexity for excluding the influence of the band-pass filter can be reduced by setting the characteristic of the band-pass filter for the received signal to be substantially flat. That is, the present invention has an advantage that the projection order until the convergence speed saturates is smaller than in the past.

The present invention permits simultaneous implementation of reduction of the computational complexity, which is a merit of the subband acoustic echo canceller, and the speeding up of the convergence for the speech input signal.

The present invention is applicable not only to the echo canceller but also to subband type noise control, system identification devices.

It will be apparent that many modifications and variations may be effected without departing from the novel concepts of the present invention.

What is claimed is:

1. A subband acoustic echo canceller which outputs a received signal to an echo path and, at the same time inputs it into an estimated echo path to generate an echo replica and subtracts said echo replica from an echo signal picked up via said echo path, said subband acoustic echo canceller comprising:

a received signal subband analysis part for dividing said received signal into a plurality of subband signals;

an echo signal subband analysis part for dividing said echo signal into a plurality of subband echo signals;

a plurality of subband estimated echo paths, each formed by a digital filter which is provided in each subband supplied with the corresponding subband received signal and generates a subband echo replica;

a plurality of subband subtraction parts for subtracting said subband echo replicas provided by said plurality of subband estimated echo paths from said plurality of subband echo signals to generate subband error signals, respectively;

a plurality of subband echo path estimation parts for estimating the transfer functions of said subband estimated echo paths from said subband error signals and said subband received signals by an adaptive algorithm so that said subband error signals are reduced to zero; and a subband synthesis part for synthesizing said subband error signals;

said received signal subband analysis part and said echo signal subband analysis part including a plurality of received signal band-pass filters and a plurality of echo signal band-pass filters for dividing said received signal and said echo signal into pluralities of subbands to generate said subband received signals and said subband echo signals, respectively, and decimation parts for decimating said subband received signals and said subband echo signals at predetermined decimation ratios to generate said plurality of subband received signals and said plurality of subband echo signals, respectively; and means for setting the stop-band attenuation of each of said received signal band-pass filters of said received signal subband analysis part at a value smaller than the stop-band attenuation of each of said echo signal band-pass filters of said echo signal subband analysis part to thereby flatten the frequency characteristics of the subband received signals relative to the subband echo signals.

2. A subband acoustic echo canceller which outputs a received signal to an echo path and, at the same time inputs it into an estimated echo path to generate an echo replica and subtracts said echo replica from an echo signal picked up via said echo path, said subband acoustic echo canceller comprising:

a received signal subband analysis part for dividing said received signal into a plurality of subband signals;

an echo signal subband analysis part for dividing said echo signal into a plurality of subband echo signals;

a plurality of subband estimated echo paths, each formed by a digital filter which is provided in each subband supplied with the corresponding subband received signal and generates a subband echo replica;

a plurality of subband subtraction parts for subtracting said subband echo replicas provided by said plurality of subband estimated echo paths from said plurality of subband echo signals to generate subband error signals, respectively;

a plurality of subband echo path estimation parts for estimating the transfer functions of said subband estimated echo paths from said subband error signals and said subband received signals by an adaptive algorithm so that said subband error signals are reduced to zero; and a subband synthesis part for synthesizing said subband error signals;

said received signal subband analysis part and said echo signal subband analysis part including a plurality of received signal multipliers and a plurality of echo signal multipliers for frequency-shifting said received signal and said echo signal toward the low-frequency side by a frequency that increases step by step; a plurality of received signal band-pass filters and a plurality of echo signal band-pass filters for band-limiting said frequency-shifted signals from said multipliers to generate a plurality of frequency-shifted subband received signals and a plurality of frequency-shifted subband echo signals, respectively, and decimation parts for decimating said subband received signals and said subband echo signals at predetermined decimation ratios to generate said plurality of subband received signals and said plurality of subband echo signals, respectively; and means for setting the stop-band attenuation of each of said received signal band-pass filters of said received signal subband analysis part at a value smaller than the stop-band attenuation of each of said echo signal band-pass filters of said echo signal subband analysis part to thereby flatten the frequency characteristics of the subband received signals relative to the subband echo signals.

3. The subband acoustic echo canceller of claim 1 or 2, wherein said means for setting the stop-band attenuation includes means for setting the band-pass filter length for said received signal in said received signal subband analysis part to be smaller than the band-pass filter length for said echo signal in said echo signal subband analysis part.

4. The subband acoustic echo canceller of claim 1 or 2, further comprising frequency characteristic flattening parts for flattening the frequency characteristics of said subband received signals which are provided to said subband echo path estimation parts.

5. The subband acoustic echo canceller of claim 3, further comprising frequency characteristic flattening parts for flattening the frequency characteristics of said subband received signals which are provided to said subband echo path estimation parts.

6. The subband acoustic echo canceller of claim 3, wherein the stop-band cutoff frequency of each of said received signal band-pass filters is set between $\pi$ and $3\pi/2$ in terms of a normalized frequency.

7. The subband acoustic echo canceller of claim 3, wherein the number of taps of each of said received signal band-pass filters is set to about ½ the tap number of each of said echo signal band-pass filters.

8. The subband acoustic echo canceller of claim 4, wherein said frequency characteristic flattening parts are each formed by an FIR filter which has an inverse characteristic of the frequency characteristic of said band-pass filter.

9. The subband acoustic echo canceller of claim 4, wherein said frequency characteristic flattening parts are each formed by an FIR filter which has an inverse characteristic of the frequency characteristic of said band-pass filter.

10. A subband acoustic echo canceller which outputs a received signal to an echo path and, at the same time inputs it into an estimated echo path to generate an echo replica and subtracts said echo replica from an echo signal picked up via said echo path, said subband acoustic echo canceller comprising:

a received signal subband analysis part for dividing said received signal into a plurality of subband signals;

an echo signal subband analysis part for dividing said echo signal into a plurality of subband echo signals;

a plurality of subband estimated echo paths, each formed by a digital filter which is provided in each subband supplied with the corresponding subband received signal and generates a subband echo replica;

a plurality of subband subtraction parts for subtracting said subband echo replicas provided by said plurality of subband estimated echo paths from said plurality of subband echo signals to generate subband error signals; respectively;

a plurality of subband echo path estimation parts for estimating the transfer functions of said subband estimated echo paths from said subband error signals and said subband received signals by an adaptive algorithm so that said subband error signals are reduced to zero; and a subband synthesis part for synthesizing said subband error signals;

wherein said received signal subband analysis part includes: a plurality of received signal band-pass filters for dividing said received signal into pluralities of subbands to generate subband received signals, and subband received signal decimation parts for decimating said subband received signals at a predetermined decimation ratio to generate said plurality of subband received signals; and said echo signal subband analysis part includes: a plurality of echo signal band-pass filters for dividing said echo signal into pluralities of subbands to generate subband echo signals and subband echo signal decimation parts for decimating said subband echo signals at the predetermined decimation ratio to generate said plurality of subband echo signals;

and further comprising frequency characteristic flattening parts for flattening the frequency characteristics of said subband received signals which are provided to said subband echo path estimation parts.

11. A subband acoustic echo canceller which outputs a received signal to an echo path and, at the same time inputs it into an estimated echo path to generate an echo replica and subtracts said echo replica from an echo signal picked up via said echo path, said subband acoustic echo canceller comprising:

a received signal subband analysis part for dividing said received signal into a plurality of subband signals;

an echo signal subband analysis part for dividing said echo signal into a plurality of subband echo signals;

a plurality of subband estimated echo paths, each formed by a digital filter which is provided in each subband supplied with the corresponding subband received signal and generates a subband echo replica;

a plurality of subband subtraction parts for subtracting said subband echo replicas provided by said plurality of subband estimated echo paths from said plurality of subband echo signals to generate subband error signals, respectively;

a plurality of subband echo path estimation parts for estimating the transfer functions of said subband estimated echo paths from said subband error signals and said subband received signals by an adaptive algorithm so that said subband error signals are reduced to zero; and a subband synthesis part for synthesizing said subband error signals;

wherein said received signal subband analysis part includes: a plurality of received signal multipliers for frequency-shifting said received signal toward the low-frequency side by a frequency that increases step by step; a plurality of received signal band-pass filters for band-limiting said frequency-shifted received signal from said multipliers to generate a plurality of frequency-shifted subband received signals; and subband received signal decimation parts for decimating said subband received signals at a predetermined decimation ratio to generate said plurality of subband received signals; and wherein said echo signal subband analysis part includes: a plurality of echo signal multipliers for frequency-shifting said echo signal toward the low-frequency side by a frequency that increases step by step; a plurality of echo signal band-pass filters for band-limiting said frequency-shifted echo signal from said multipliers to generate a plurality of frequency-shifted subband echo signals; and subband echo signal decimation parts for decimating said subband echo signals at the predetermined decimation ratio to generate said plurality of subband echo signals;

and further comprising frequency characteristic flattening parts for flattening the frequency characteristics of said subband received signals which are provided to said subband echo path estimation parts.

12. The subband acoustic echo canceller of claim 10 or 11, wherein said frequency characteristic flattening parts are each formed by an FIR filter which has an inverse characteristic of the frequency characteristic of said received signal band-pass filter.

13. The subband acoustic echo canceller of claim 10 or 11, wherein said frequency characteristic flattening parts are each formed by an IIR filter which has an inverse characteristic of the frequency characteristic of said received signal band-pass filter.

14. The subband acoustic echo canceller of claim 10 or 11, wherein said received signal subband analysis part is provided in each of right and left channels, said echo signal subband analysis part is provided in each of said right and left channels, said frequency characteristic flattening part is provided in each of said right and left channels, and a set of said subband estimated echo path, said subband subtractor and said subband estimation part is provided in each of said right and left channels, and further comprising a first vector concatenating part for vector-concatenating flattened subband received signals from said right- and left-channel frequency characteristic flattening parts for input into said right- and left-channel subband estimation parts, and a second vector concatenating part for vector-concatenating said right- and left-channel subband received signals from said right- and left-channel received signal subband analysis parts for input into said right- and left-channel subband estimated echo paths.

15. The subband acoustic echo canceller of claim 14, wherein the stop-band attenuation of each band-pass filter in said right- and left-channel received signal subband analysis parts is smaller than the stop-band attenuation of each band-pass filter in said right- and left-channel echo signal subband analysis parts.

16. The subband acoustic echo canceller of claim 14, wherein the length of each band-pass filter in said right- and left-channel received signal analysis parts is smaller than the length of each band-pass filter in said right- and left-channel echo signal subband analysis parts.

* * * * *